(12) United States Patent
Barry et al.

(10) Patent No.: US 7,763,306 B2
(45) Date of Patent: Jul. 27, 2010

(54) METHOD FOR REDUCING ACRYLAMIDE FORMATION IN THERMALLY PROCESSED FOODS

(75) Inventors: David Lawrence Barry, Highland Village, TX (US); Colin Jeffrey Burnham, Castle Donnington (GB); Pravin Maganlal Desai, Carrollton, TX (US); Ponnattu Kurian Joseph, Irving, TX (US); Henry Kin-Hang Leung, Plano, TX (US); John Richard Masson, Houghton on the Hill (GB); V. N. Mohan Rao, Plano, TX (US); Robert William Saunders, Nottingham (GB); James William Stalder, Dallas, TX (US); Michael Grant Topor, Carrollton, TX (US)

(73) Assignee: Frito-Lay North America, Inc., Plano, TX (US)

( * ) Notice: Subject to any disclaimer, the term of this patent is extended or adjusted under 35 U.S.C. 154(b) by 1027 days.

(21) Appl. No.: 11/263,400

(22) Filed: Oct. 31, 2005

(65) Prior Publication Data
US 2006/0051471 A1 Mar. 9, 2006

Related U.S. Application Data

(62) Division of application No. 10/371,448, filed on Feb. 21, 2003, now Pat. No. 7,393,550.

(51) Int. Cl.
*A23L 1/01* (2006.01)
(52) U.S. Cl. .............. 426/637; 426/441; 426/466; 426/523
(58) Field of Classification Search ............ 426/615, 426/637, 438, 443, 465, 523, 441, 466
See application file for complete search history.

(56) References Cited

U.S. PATENT DOCUMENTS 1,053 A 12/1838 Hatfield (Continued)

FOREIGN PATENT DOCUMENTS

CL 403-2002 6/2003

(Continued)

OTHER PUBLICATIONS

U.S. Department of Health & Human Services article entitled "Exploratory Data on Acrylamide in Foods", found at http://www.mindfully.org/Food/Acrylamide-Foods-FDA, Dec. 4, 2002 (9 pgs.).

(Continued)

*Primary Examiner*—Drew E Becker
(74) *Attorney, Agent, or Firm*—Colin P. Cahoon; Chad E. Walter; Carstens & Cahoon, LLP

(57) ABSTRACT

A process and apparatus for a method for reducing the amount of acrylamide in thermally processed foods. This invention permits the production of foods having significantly reduced levels of acrylamide. The method relies on the manipulation of various unit operations used in the production of food products, particularly the washing and cooking unit operations. For example, the washing unit operation can be modified to provide a contacting step at an increased time and temperature, and adding components such as calcium chloride and L-cysteine to an aqueous solution used for the contacting. The cooking unit operation can be modified by dividing it into at least a higher-temperature first heating step and a lower-temperature second heating step in order to avoid the high-temperature/low-moisture conditions most favorable for acrylamide formation.

13 Claims, 10 Drawing Sheets

| PARAMETER | CONTROL | TEST 1 | TEST 2 | TEST 3 | TEST 4 |
|---|---|---|---|---|---|
| INITIAL PAR FRY OIL TEMPERATURE C | 177 | 177 | 177 | 177 | 177 |
| PAR FRYER PRESSURE, MBAR | ATMOSPHERIC | ATMOSPHERIC | ATMOSPHERIC | ATMOSPHERIC | ATMOSPHERIC |
| PAR FRY TIME, SEC | 153 | 101 | 76 | 63 | 43 |
| PAR FRY SLICE MOISTURE, WT % | 0.83 | 3 | 5 | 7.5 | 10 |
| FINISH FRY OIL TEMPERATURE, C | NO FINISH FRY | 120 | 120 | 120 | 120 |
| FINISH FRY PRESSURE, MBAR | NO FINISH FRY | 100 | 100 | 100 | 100 |
| FINISH FRY TIME, SEC | NO FINISH FRY | 44 | 85 | 101 | 118 |
| FINISHED CHIP MOISTURE, WT % | 0.83 (SAME AS PAR FRY MOISTURE) | 0.71 | 0.74 | 0.82 | 0.96 |
| FINISHED CHIP AA, PPB | 370 | 220 | 48 | 34 | 13 |
| FINISHED CHIP OIL CONTENT % | 49.8 | 47.5 | 44.4 | 44.8 | 42.5 |

U.S. PATENT DOCUMENTS

| | | | |
|---|---|---|---|
| 1,132,296 A | 3/1915 | Anspach | |
| 1,782,960 A | 11/1930 | Erysin | |
| 2,448,152 A | 8/1948 | Patton | |
| 2,490,431 A | 12/1949 | Greene | |
| 2,498,024 A | 2/1950 | Baxter | |
| 2,584,893 A | 2/1952 | Lloyd | |
| 2,611,705 A * | 9/1952 | Hendel | 426/438 |
| 2,704,257 A | 3/1955 | deSellano | |
| 2,744,017 A | 5/1956 | Baldwin | |
| 2,759,832 A | 8/1956 | Cording, Jr. | |
| 2,762,709 A | 9/1956 | Janis | |
| 2,780,552 A | 2/1957 | Willard | |
| 2,893,878 A | 7/1959 | Simon | |
| 2,905,559 A | 9/1959 | Anderson | |
| 2,910,367 A | 10/1959 | Melnick | |
| 2,987,401 A | 6/1961 | Johnston | |
| 3,026,885 A | 3/1962 | Eytinge | |
| 3,027,258 A | 3/1962 | Markakis | |
| 3,038,810 A | 6/1962 | Akerboom | |
| 3,044,880 A * | 7/1962 | Bogyo et al. | 426/431 |
| 3,085,020 A | 4/1963 | Backinger | |
| 3,278,311 A | 10/1966 | Brown | |
| 3,305,366 A | 2/1967 | Sutton | |
| 3,359,123 A | 12/1967 | Katucki | |
| 3,369,908 A | 2/1968 | Gonzalez | |
| 3,404,986 A | 10/1968 | Wimmer | |
| 3,436,229 A | 4/1969 | Simpson | |
| 3,545,979 A | 12/1970 | Ghafoori | |
| 3,578,463 A | 5/1971 | Smith | |
| 3,608,728 A | 9/1971 | Trimble | |
| 3,620,925 A | 11/1971 | Sunto-gun et al. | |
| 3,627,535 A | 12/1971 | Davidson | |
| 3,634,095 A * | 1/1972 | Willard | 426/441 |
| 3,652,402 A | 3/1972 | Chibata et al. | |
| 3,687,679 A * | 8/1972 | Sijbring | 426/550 |
| 3,690,895 A | 9/1972 | Amadon | |
| 3,725,087 A | 4/1973 | Miller | |
| 3,773,624 A | 11/1973 | Wagner et al. | |
| 3,782,973 A | 1/1974 | Pittet | |
| 3,812,775 A * | 5/1974 | Sijbring | 99/404 |
| 3,914,436 A | 10/1975 | Nakadai et al. | |
| 3,917,866 A | 11/1975 | Purves | |
| 3,987,210 A | 10/1976 | Cremer | |
| 3,997,684 A | 12/1976 | Willard | |
| 3,998,975 A | 12/1976 | Liepa | |
| 4,005,225 A | 1/1977 | Craig | |
| 4,073,952 A | 2/1978 | Standing | |
| 4,084,008 A | 4/1978 | Yueh | |
| 4,122,198 A | 10/1978 | Wisdom | |
| 4,124,727 A | 11/1978 | Rockland | |
| 4,136,208 A | 1/1979 | Light et al. | |
| 4,140,801 A | 2/1979 | Hilton | |
| 4,167,137 A | 9/1979 | van Remmen | |
| 4,192,773 A | 3/1980 | Yoshikawa et al. | |
| 4,199,612 A | 4/1980 | Fragas | |
| 4,210,594 A | 7/1980 | Logan | |
| 4,272,554 A | 6/1981 | Schroeder et al. | |
| 4,277,510 A | 7/1981 | Wicklund | |
| 4,312,892 A | 1/1982 | Rubio | |
| 4,317,742 A | 3/1982 | Yamaji et al. | |
| 4,418,088 A | 11/1983 | Cantenot | |
| 4,461,832 A | 7/1984 | Tschang | |
| 4,537,786 A * | 8/1985 | Bernard | 426/438 |
| 4,555,409 A | 11/1985 | Hart | |
| 4,582,927 A | 4/1986 | Fulcher | |
| 4,594,260 A | 6/1986 | Vaquerio | |
| 4,595,597 A | 6/1986 | Lenchin et al. | |
| 4,645,679 A | 2/1987 | Lee | |
| 4,673,581 A | 6/1987 | Fulcher | |
| 4,706,556 A | 11/1987 | Wallace | |
| 4,721,625 A | 1/1988 | Lee | |
| 4,749,579 A | 6/1988 | Haydock | |
| 4,751,093 A | 6/1988 | Hong | |
| 4,756,916 A * | 7/1988 | Dreher et al. | 426/302 |
| 4,806,377 A | 2/1989 | Ellis | |
| 4,844,930 A | 7/1989 | Mottur | |
| 4,844,931 A | 7/1989 | Webb | |
| 4,863,750 A * | 9/1989 | Pawlak et al. | 426/438 |
| 4,884,780 A | 12/1989 | Ohashi | |
| 4,889,733 A | 12/1989 | Willard | |
| 4,900,576 A | 2/1990 | Bonnett | |
| 4,917,909 A | 4/1990 | Prosise | |
| 4,931,296 A | 6/1990 | Shanbhag | |
| 4,933,199 A | 6/1990 | Neel | |
| 4,937,085 A | 6/1990 | Cherry | |
| 4,963,373 A | 10/1990 | Fan | |
| 4,966,782 A | 10/1990 | Heidolph et al. | |
| 4,971,813 A | 11/1990 | Strobel | |
| 4,978,684 A | 12/1990 | Cerami | |
| 4,985,269 A | 1/1991 | Irvin | |
| 5,002,784 A * | 3/1991 | Pare et al. | 426/241 |
| 5,009,903 A | 4/1991 | deFigueiredo et al. | |
| 5,035,904 A | 7/1991 | Huang | |
| 5,045,335 A | 9/1991 | DeRooj et al. | |
| 5,071,661 A | 12/1991 | Stubbs | |
| 5,087,467 A | 2/1992 | Schwank | |
| 5,126,153 A | 6/1992 | Beck | |
| 5,134,263 A | 7/1992 | Smith | |
| 5,167,975 A | 12/1992 | Tsurumaki | |
| 5,176,933 A | 1/1993 | Fulcher | |
| 5,196,225 A | 3/1993 | Lush | |
| 5,279,840 A | 1/1994 | Baisier | |
| 5,292,542 A | 3/1994 | Beck | |
| 5,298,274 A | 3/1994 | Khalsa | |
| 5,356,646 A | 10/1994 | Simic-Glavaski | |
| 5,362,511 A | 11/1994 | Villagran | |
| 5,368,879 A | 11/1994 | White | |
| 5,370,898 A | 12/1994 | Zussman | |
| 5,389,389 A | 2/1995 | Beck | |
| 5,391,385 A | 2/1995 | Seybold | |
| 5,393,543 A | 2/1995 | Laufer | |
| 5,394,790 A | 3/1995 | Smith | |
| 5,441,758 A | 8/1995 | Lewis | |
| 5,447,742 A | 9/1995 | Malvido | |
| 5,458,903 A | 10/1995 | Colson | |
| 5,464,642 A | 11/1995 | Villagran et al. | |
| 5,464,643 A | 11/1995 | Lodge | |
| 5,505,978 A | 4/1996 | Roy | |
| 5,514,387 A | 5/1996 | Zimmerman et al. | |
| 5,534,280 A | 7/1996 | Welch | |
| 5,554,405 A | 9/1996 | Fazzolare | |
| 5,558,886 A | 9/1996 | Martinez-Bustos | |
| 5,589,213 A | 12/1996 | Desai | |
| 5,603,972 A | 2/1997 | McFarland | |
| 5,603,973 A | 2/1997 | Benson | |
| 5,620,727 A | 4/1997 | Gerrish et al. | |
| 5,676,042 A | 10/1997 | Sakuma | |
| 5,690,982 A | 11/1997 | Fazzolare | |
| 5,695,804 A | 12/1997 | Hnat | |
| 5,707,671 A | 1/1998 | Beck | |
| 5,747,084 A | 5/1998 | Cochran | |
| 5,792,499 A | 8/1998 | Atwell | |
| 5,846,589 A | 12/1998 | Baker | |
| 5,858,431 A | 1/1999 | Wiedersatz | |
| 5,919,691 A | 7/1999 | Schulein | |
| 5,945,146 A | 8/1999 | Twinam | |
| 5,947,010 A | 9/1999 | Barry | |
| 5,972,367 A | 10/1999 | Inoue | |
| 5,972,397 A | 10/1999 | Durance | |
| 6,001,409 A | 12/1999 | Gimmler | |
| 6,016,096 A | 1/2000 | Barnes | |
| 6,025,011 A | 2/2000 | Wilkinson | |
| 6,033,707 A | 3/2000 | Lanner | |
| 6,039,978 A | 3/2000 | Bangs et al. | |

| | | | |
|---|---|---|---|
| 6,066,353 A | 5/2000 | Villagran |
| 6,068,872 A | 5/2000 | Hashiguchi |
| 6,068,873 A | 5/2000 | Delrue |
| RE36,785 E | 7/2000 | Colson |
| 6,139,884 A | 10/2000 | Shifferaw |
| 6,159,530 A | 12/2000 | Christiansen et al. |
| 6,207,204 B1 | 3/2001 | Christiansen |
| 6,210,720 B1 | 4/2001 | Leusher et al. |
| 6,227,421 B1 | 5/2001 | Richard |
| 6,287,672 B1 | 9/2001 | Fields |
| 6,290,999 B1 | 9/2001 | Gerrish |
| 6,299,914 B1 | 10/2001 | Christiansen |
| 6,335,048 B1 | 1/2002 | Swarvar |
| 6,358,544 B1 | 3/2002 | Henry, Jr. |
| 6,383,533 B1 | 5/2002 | Soeda |
| 6,419,965 B1 | 7/2002 | Douaire |
| 6,436,458 B2 | 8/2002 | Kuechle |
| 6,521,871 B1 | 2/2003 | Shelton |
| 6,528,768 B1 | 3/2003 | Simic-Glavaski |
| 6,531,174 B2 | 3/2003 | Barrett et al. |
| 6,558,730 B1 | 5/2003 | Gisaw |
| 6,599,547 B1 | 7/2003 | Villagran |
| 6,607,777 B1 | 8/2003 | Walsh |
| 6,638,554 B1 | 10/2003 | Rubio |
| 6,638,558 B2 | 10/2003 | Brubacher |
| 6,716,462 B2 | 4/2004 | Prosise et al. |
| 6,770,469 B2 | 8/2004 | Yamaguchi |
| 6,778,887 B2 | 8/2004 | Britton |
| 6,872,417 B1 | 3/2005 | Freudenrich |
| 6,896,528 B2 | 5/2005 | Kubota |
| 6,929,812 B2 | 8/2005 | Van Der Doe |
| 6,989,167 B2 | 1/2006 | Howie |
| 7,037,540 B2 | 5/2006 | Elder |
| 7,122,719 B2 | 10/2006 | Hakimi |
| 7,169,417 B2 | 1/2007 | Lang |
| 7,189,422 B2 | 3/2007 | Howie |
| 7,220,440 B2 | 5/2007 | Dria |
| 7,267,834 B2 | 9/2007 | Elder |
| 7,291,380 B2 | 11/2007 | Nyholm |
| 7,393,550 B2 | 7/2008 | Barry |
| 7,514,113 B2 | 4/2009 | Zyzak |
| 7,524,519 B2 | 4/2009 | Zyzak |
| 7,527,815 B2 | 5/2009 | Teras |
| 2002/0018838 A1 | 2/2002 | Zimmerman |
| 2002/0025367 A1 | 2/2002 | Koehler |
| 2002/0129713 A1 | 9/2002 | Caridis |
| 2003/0049359 A1 | 3/2003 | Kulkarni |
| 2003/0155346 A1 | 8/2003 | Simic-Glavaski et al. |
| 2003/0183092 A1 | 10/2003 | Barber |
| 2003/0198725 A1 | 10/2003 | Cardenas |
| 2003/0219518 A1* | 11/2003 | Li ........................... 426/478 |
| 2004/0047973 A1 | 3/2004 | Bourhis et al. |
| 2004/0058045 A1 | 3/2004 | Elder et al. |
| 2004/0058046 A1 | 3/2004 | Zyzak et al. |
| 2004/0058054 A1 | 3/2004 | Elder et al. |
| 2004/0081724 A1 | 4/2004 | Dria et al. |
| 2004/0086597 A1 | 5/2004 | Awad |
| 2004/0101607 A1* | 5/2004 | Zyzak et al. ............. 426/425 |
| 2004/0105929 A1 | 6/2004 | Tomoda et al. |
| 2004/0107455 A1 | 6/2004 | Rommens et al. |
| 2004/0109926 A1 | 6/2004 | Tomoda et al. |
| 2004/0115321 A1 | 6/2004 | Tricoit et al. |
| 2004/0126469 A1 | 7/2004 | Tomoda et al. |
| 2004/0131737 A1 | 7/2004 | Tomoda |
| 2004/0180125 A1 | 9/2004 | Plank |
| 2004/0180129 A1 | 9/2004 | Plank |
| 2004/0197012 A1 | 10/2004 | Bourg |
| 2004/0224066 A1 | 11/2004 | Lindsay |
| 2005/0064084 A1 | 3/2005 | Elder |
| 2005/0074538 A1 | 4/2005 | Elder |
| 2005/0079254 A1 | 4/2005 | Corrigan |
| 2005/0118322 A1 | 6/2005 | Elder |
| 2005/0152811 A1 | 7/2005 | Taylor |
| 2005/0196504 A1 | 9/2005 | Finley |
| 2005/0214411 A1 | 9/2005 | Lindsay |
| 2006/0088633 A1 | 4/2006 | Barber |
| 2006/0110503 A1 | 5/2006 | Bates |
| 2006/0127534 A1 | 6/2006 | Elder |
| 2006/0193964 A1 | 8/2006 | Eckhoff |
| 2006/0210693 A1 | 9/2006 | Oftring |
| 2006/0216376 A1 | 9/2006 | Milici |
| 2006/0216388 A1 | 9/2006 | Christensen |
| 2007/0042080 A1 | 2/2007 | Plomp |
| 2007/0087101 A1 | 4/2007 | Gusek |
| 2007/0141225 A1 | 6/2007 | Elder |
| 2007/0141226 A1 | 6/2007 | Elder |
| 2007/0141227 A1 | 6/2007 | Boudreaux |
| 2007/0148318 A1 | 6/2007 | Rubio |
| 2007/0166439 A1 | 7/2007 | Soe |
| 2007/0178219 A1 | 8/2007 | Boudreaux |
| 2007/0184175 A1 | 8/2007 | Rubio |
| 2007/0196556 A1 | 8/2007 | Van Der Meer |
| 2007/0281062 A1 | 12/2007 | Bourg |
| 2007/0292589 A1 | 12/2007 | Elder |
| 2008/0003340 A1 | 1/2008 | Karwowski |
| 2008/0008780 A1 | 1/2008 | Streekstra |
| 2008/0138480 A1 | 6/2008 | Bows |
| 2008/0166450 A1 | 7/2008 | Corrigan |
| 2008/0166452 A1 | 7/2008 | Corrigan |
| 2008/0279994 A1 | 11/2008 | Cantley |
| 2008/0299273 A1 | 12/2008 | Bhaskar |
| 2009/0074915 A1 | 3/2009 | Hendriksen |
| 2009/0098265 A1 | 4/2009 | Kock |
| 2009/0191310 A1 | 7/2009 | Zyzak |

FOREIGN PATENT DOCUMENTS

| | | |
|---|---|---|
| EP | 1 419 702 A1 | 5/2004 |
| EP | 1 419 703 A1 | 5/2004 |
| ES | 2019044 | 2/1990 |
| FR | 874453 | 8/1942 |
| GB | 156905 | 1/1921 |
| GB | 335214 | 9/1930 |
| GB | 1132296 | 10/1968 |
| GB | 1519049 | 7/1978 |
| JP | 68006927 | 9/1965 |
| JP | 70009815 | 10/1966 |
| JP | 57100179 | 12/1980 |
| JP | 62048351 A | 3/1987 |
| JP | 4104753 | 4/1992 |
| JP | 6030782 A | 2/1994 |
| JP | 06160713 | 6/1994 |
| JP | 2004-313183 | 11/1994 |
| JP | 05123126 | 5/1998 |
| JP | 10136883 | 5/1998 |
| JP | 11056280 | 3/1999 |
| JP | 11178536 | 7/1999 |
| JP | 2004-180563 | 7/2004 |
| JP | 2005-278448 | 10/2005 |
| RU | 1822863 | 6/1993 |
| RU | 2048512 | 11/1995 |
| RU | 2078797 | 5/1997 |
| RU | 2140927 | 11/1999 |
| RU | 2216574 | 11/2003 |
| WO | 96/01572 | 1/1996 |
| WO | 00/04784 | 2/2000 |
| WO | 01/91581 | 12/2001 |
| WO | WO 2004/004484 A2 | 1/2004 |
| WO | 2004/026043 | 4/2004 |
| WO | WO 2004/028276 | 4/2004 |
| WO | WO 2004/028277 | 4/2004 |
| WO | WO 2004/028278 | 4/2004 |
| WO | WO 2004/030468 | 4/2004 |
| WO | WO 2004/032647 | 4/2004 |
| WO | WO 2004/032648 | 4/2004 |
| WO | WO 2004/039174 | 5/2004 |

| | | |
|---|---|---|
| WO | WO 2004/040999 | 5/2004 |
| WO | WO 2004/047559 | 6/2004 |
| WO | WO 2004/060078 | 7/2004 |
| WO | 2004/080205 | 9/2004 |
| WO | 2007/106996 | 9/2007 |

OTHER PUBLICATIONS

Don Mottram—The University of Reading, "Acrylamide in Cooked Foods—the Latest "Food Scare"", 2002 (44 pgs.).
Report from Swedish Scientific Expert Committee of the Swedish National Food Administration, "Acrylamide in Food—Mechanisms of Formation and Influencing Factors During Heating of Foods", Apr. 24, 2002 (22 pgs.).
Amanda Yarnell, Chemical & Engineering News article entitled "Acrylamide Mystery Solved", found at http://pubs.acs.org/cen/today/oct4.html, Oct. 4, 2002 (3 pgs.).
Janet Raloff, Science News Online article entitled "Hot Spuds: Golden Path to Acrylamide in Food", found at http://www.sciencenews.org/20021005/fob5.asp, Week of Oct. 5, 2002, vol. 162 (3 pgs.).
Lauran Neergaard, Health Zone article entitled "Scientists: Chemical Reaction May Create Carcinogen", found at http://www.cjonline.com/stories/093002/hea_carcinogen.shtml, Sep. 30, 2002 (3 pgs.).
Procter & Gamble article entitled "New Findings Show Acrylamides Are Found in a Wider Variety of Foods and May Lead to New Ways of Reducing Acrylamide Levels" found at http://biz_yahoo.com/prnews/020927/clf005_1_html, Sep. 27, 2002 (2 pgs.).
Center for Science in the Public Interest article entitled "New Tests Confirm Acrylamide in American Foods", found at http://www.cspinet.org/new/200206251.html, Jun. 25, 2002 (2 pgs.).
World Health Organization Deptartment of Food Safety Report "FAO/WHO Consultation on the Health Implications of Acrylamide in Food", Joint FAO/WHO Consulation, Geneva, Jun. 25-27, 2002 found at http://www.who.int/fsf/Acrylamide/SummaryreportFinal.pdf (8 pgs.).
U. S. Department of Health and Human Services, Public Health Service, National Toxicology Program, 9th Report on Carcinogens Revised Jan. 2001 found at http://win2000.kreativeb.it/sanitaweb/web/Biblioteca/carcinogens/rahc/acrylamide.pdf (5 pgs.).
Lindsay Murray, "Acrylamide", found at http://www.inchem.org/documents/pims/chemical/pim652.htm, Jun. 1998 (8 pgs.).
Centre for Molecular and Biomolecular Informatics article entitled "An Amino Acid Bedtime Story", found at http://www.cmbi.kun.nl.gvteach/HAN/alg/infopages/bedtime.html, material from Friedli Enterprises, Georges-Louis Friedli, PgDip.,MSc.,PhD., Apr. 18, 2002 (4 pgs.).
Home Page for Frostburg State University—Organic Chemistry Help, article entitled "Nucleophilic Addition to Carbonyl Groups" found at http://www.chemhelper.com/nucadd.html, 2000 ( 1 pg.).
Karl Harrison, article entitled "Amino Acids and Proteins" found at http://www.chem.ox.ac.uk/mom/amino_acids/introduction.html, 1996 (1 pg.).
Karl Harrison, article entitled "Molecules of the Month", found at http://www.chem.ox.ac.uk/mom/, 1996 (1 pg.).
Eur. J. Lipid Sci. Technol. 104 (2002) 762-771 article entitled "Analysis of acrylamide and mechanisms of its formation in deep-fried products" dated Sep. 27, 2002 (10 pgs.).
Nature magazine article entitled "Acrylamide is formed in the Maillard reaction" dated Oct. 3, 2002, which can be found at www.nature.com/nature (1 pg.).
Nature magazine article entitled "Acrylamide from Maillard reaction products" dated Oct. 3, 2002, which can be found at www.nature.com/nature (1 pg.).
Deutsche Lebensmittel-Rundschau 98 Jahrgang, Heft article entitled "Formation of Acrylamide in Heated Potato Products—Model Experiments Pointing to Asparagine as Precursor" dated Nov. 2002 (4 pgs.).
C. Benedito De Barber, J.A. Prieto, C. Collar, "Reversed-Phase High-Performance Liquid Chromatography Analysis of Changes in Free Amino Acids During Wheat Bread Dough Fermentation", Cereal Chemistry, Feb. 26, 1989, pp. 283-288, vol. 66, No. 4, American Association of Cereal Chemists, Inc., USA.
Patricia C. Dunlop, Gail M. Meyer, Robert J. Roon, "Nitrogen Catabolite Repression of Asparaginase II in *Saccharomyces cerevisiae*", Journal of Bacteriology, Jul. 1980, pp. 422-426, vol. 143, No. 1, Department of Biochemistry, University of Minnesota, Minneapolis, Minn. 55455.
Varoujan A. Yaylayan, Andrzej Wnorowski, Carolina Perez Locas, "Why Asparagine Needs Carbohydrates to Generate Acrylamide", Journal of Agricultural and Food Chemistry, Feb. 11, 2003, pp. 1753-1757, vol. 51, Dept. of Food Science and Agricultural Chemistry, McGill University, Quebec, Canada.
Mendel Friedman, "Chemistry, BioChemistry, and Safety of Acrylamide. A Review", Journal of Agricultural and Food Chemistry, Jul. 3, 2003, pp. 4504-4526, vol. 51 (16), American Chemical Society, Western Regional Research Center, Albany, CA.
Kim, et al., "Asparaginase II of *Saccaromyces cerevisiae*", The Journal of Biological Chemistry, 263 (24): 11948-11953.
David V. Zyzak et al., "Acrylamide Formation Mechanism in Heated Foods" Journal of Agricultural and Food Chemistry, Jun. 28, 2003, pp. 4782-4787, vol. 51, American Chemical Society, USA.
Dr. Jacques Olivier Bosset, et al., "Mitteilungen aus Lebensmitteluntersuchung und Hygiene", Jun. 2002, vol. 93, Offizielles Organ der Schweizerischen Gesellschaft fur Lebensmittel-und Umweltchemie und der Schweizerischen Gesellschaft fur Lebensmittelhygiene.
Adam Becalski, Benjamin P.-Y. Lau, David Lewis, and Stephen W. Seaman, "Acrylamide in Foods: Occurrence, Sources, and Modeling", Journal of Agricultural and Food Chemistry, 2003, pp. 802-808, vol. 51, American Chemical Society, USA.
James E. Lawrence, Acrylamide in Food, Health Canada, Sep. 23, 2002.
Biederman, Marcus, et al. "Methods for Determining the Potential of Acrylamide Formation and its Elimination in Raw Materials for Food Preparation, Such as Potatoes"; Official Food Control Authority of the Canton of Zurich.
Institute of Food Science & Technology (UK); "Additional Research on Acrylamide in Food Essential; Scientists Declare"; Joint Press Release FAO/WHO/51; Jun. 27, 2002.
Tareke, Eden, et al.; "Analysis of Acrylamide, a Carcinogen Formed in Heated Foodstuffs"; Journal of Agricultural and Food Chemistry, pp. A-1.
Biederman, Marcus, et al; "Experiments on Acrylamide Formation and Possibilities to Decrease the Potential of Acrylamide Formation in Potatoes" Official Food Control Authority of the Canton of Zurich.
Granda, C, et al; "Reduction of Acrylamide Formation in Potato Chips by Low-temperature Vacuum Frying", Journal of Food Science E405, vol. 69, Nr. 8, 2004, Oct. 7, 2004.
Granda, Claudia, et al; "Effect of Raw Potato Composition on Acrylamide Formation in Potato Chips", Journal of Food Science E519, vol. 70, Nr. 9, 2005, Nov. 16, 2005.
Garayo, Jagoba, et al; "Vacuum frying of potato chips", Journal of Food Engineering 55 (2002) 181-191.
Granda, Claudia, et al; "Kinetics of Acrylamide Formation During Traditional and Vacuum Frying of Potato Chips", Journal of Food Process Engineering 28 (2005) 478-493.
Claeys, Wendie L., et al; "Quantifying the formation of carcinogens during food processing: acrylamide", Trends in Food Science & Technology 16 (205) 181-193.
Working Group 1: Mechanisms of Formation of Acrylamide in Food Summary Report (Document Undated); URL: http://www.jifsan.umd.edu/presentations/acrylamide2002/wg1_mech_form_summ_report.pdf.
Browning prevention in fresh and dehydrated potatoes by SH-containing amino acids, Mendel Friedman, Ibolya Molnar-Perl and Derek R. Knighton; Food Additives and Contaminants, 1992, vol. 9, No. 5, 499-503.
Abdel-Kader, Zakia M., "Effect of blanching on the diffusion of glucose from potatoes" (Abstract), Wiley InterScience Journals: Nahrung / Food vol. 36, Iss. 1, 1992, 1 page.
Abstracts of literature search, "Pathway from Asparagine to Acrylamide," 17 pages.
Alternative Medicine Review "Glutathione, Reduced (GSH)" vol. 6, No. 6, 2001, pp. 601-607.

Amrein, Thomas, "Influence of Thermal Processing Conditions on Acrylamide Generation and Browning in a Potato Model System," J. Agric. Food Chem. 2006, 54, pp. 5910-5916.
Ashoor, S.H. & Zent, J.B., "Maillard Browning of Common Amino Acids and Sugars," (Abstract), Wiley InterScience Journals: J. Food Science, vol. 49, Issue 4, Jul. 1984, 2 pages.
Associated Press Washington—"Habrian descubierto el origen de sustancia cancerigena en las papas fritas," Sep. 30, 2002, 2 pages.
Becalski, Adam, et al., "Acrylamide in French Fries: Influence of Free Amino Acids and Sugars," (Abstract), J. Agric. Food Chem. 52 (12), May 22, 2004, 1 page.
Brathen, Erland, et al., "Addition of Glycine Reduces the Content of Acrylamide in Cereal and Potato Products," J. Agric. Food Chem. 2005, vol. 53, pp. 3259-3264.
CBC News CBC.CA "Food sector told to cut down on toxins in chips, fries," Sep. 19, 2002, 2 pages.
CBC News CBC.CA "Scientists find route for toxin to form in fried, baked foods," Sep. 30, 2002, 3 pages.
CBC News CBC.CA "Some acrylamide with your fries?" Jan. 14, 2003, 6 pages.
Database WPI Week 199329 Derwent Publications Ltd., London, GB; AN 1993-234163 XP002473734 & SU 1 750 586 A1 (Interbios Res Assoc) Jul. 30, 1992, 1 page.
Database WPI Week 199805 Thomson Scientific, London, GB; AN 1998-042903 XP002503379, Dec. 4, 1996, 1 page.
de Meulenaer, Bruno, et al., "Comparison of Potato Varieties Between Seasons and Their Potential for Acrylamide Formation," J. Science Food Agric., vol. 88, 2008, pp. 313-318.
de Vleeschouwer, Kristel, et al., "Impact of pH on the Kinetics of Acrylamide Formation/Elimination Reactions in Model Systems," J. Agric. Food Chem. vol. 54, 2006, pp. 7847-7855.
de Wilde, Tineke, et al., "Influence of Fertilization on Acrylamide Formation during Frying of Potatoes Harvested in 2003," J. Agric. Food Chem., 2006, vol. 54, pp. 404-408.
El Pais.com, "Hallada Ia reaccion quimica que produce Ia acrilamida en las frituras," Jul. 15, 2009, 1 page.
European Commission—Health and Consumer Protection Directorate-General, "Opinion of the Scientific Committee on Food on new findings regarding the presence of acrylamide in food," Jul. 3, 2002, 16 pages.
European Food Safety Authority, Report of "Workshop on Acrylamide Formation in Food," Nov. 17, 2003, Brussels, 22 pages.
Food Safety Consultations "Health Implications of Acrylamide in Food" Report of a Joint FAO/WHO Consultation, Geneva, Switzerland, Jun. 25-27, 2002, 38 pages.
Joint FAO/WHO Expert Commission on Food Additives, 64th Meeting, Rome, Feb. 8-17, 2005, 47 pages.
Fan, Xuetong, et al. "Effectiveness of Ionizing Radiation in Reducing Furan and Acrylamide Levels in Foods" J. Agric. Food Chem. 2006, 54, pp. 8266-8270.
Fiselier, K., et al., "Brown potato Croquettes Low in Acrylamide by Coating with Egg/Breadcrumbs," Eur. Food Res. Technol. (2004) 219:111-115.
Fiselier, Katell, et al., "Higher Acrylamide Contents in French Fries Prepared from 'Fresh' Prefabricates," Eur. Food Res. Technol. (2005) 221:376-381.
Food Standards Agency, "Study of Acrylamide in Food," May 17, 2002, 7 pages.
Francis, Frederick J., "Encyclopedia of Food Science and Technology," 2nd ed., 2000, pp. 2160-2161.
Freshfields Bruckhaus Deringer "Acrylamide in food—The approach of regulators across Europe," Feb. 2003 (20 pages).
Friedman, Mendel, et al., "Inhibition of Browning by Sulfur Amino Acids. 1. Heated Amino Acid-Glucose Systems," J. Agric. Food Chem., 1990, 38, pp. 1641-1647.
Friedman, Mendel, "The Impact of the Maillard Reaction on the Nutritional Value of Food Proteins," Ch. 6 from The Maillard Reaction: Consequences for the Chemical and Life Sciences, Ikan, Raphael (ed.), 1996, 24 pages.
Gokmen, Vural, et al., "Acrylamide formation is prevented by divalent cations during the Maillard reaction," Food Chemistry (2006) doi: 10.1016/j.foodchem.2006.08.011, 8 pages.
Harmony House Foods, Inc., http://web.archive.org/web/20050425210612/www.harmonyhousefoods.com/slicedpotato.html, Apr. 25, 2005, 2 pages.
Health Canada Food & Nutrition "Acrylamide and Food" Dec. 1, 2005 (3 pages).
Health Canada Food & Nutrition "Major pathway of formation of acrylamide in foods and possible approaches to mitigation" Mar. 11, 2005 (2 pages).
Health Canada OCAPI Involving You publication, "Acrylamide and Food," vol. 2, No. 1, Autumn 2002, 2 pages.
Heldman, Dennis R., et al. "Principles of Food Processing" book, 1997, p. 193.
Hughes B.P. "The amino acid composition of potato protein and of cooked potato" British J. of Nutrition, vol. 12, Issue 02, May 1958, pp. 188-195.
Igoe, Robert, Dictionary of Food Ingredients, 4th ed., (Aspen Publishers 2001), pp. 24, 35, 43, 109, and 167.
Ishihara, Katsuyuki, et al. "Examination of Conditions inhibiting the Formation of Acrylamide in the Model System of Fried Potato" Biosci. Biotechnol. Biochem., 70(7), 2006, pp. 1616-1621.
Jacobs, Morris B., Ph.D. "The Chemistry and Technology of Food and Food Products" textbook, 1951, pp. 221-226.
Jespersen, Neil "Chemistry" from Barron's College Review Series on Science, 1997, p. 210.
Jung, M.Y. et al. "A Novel Technique for Limitation of Acrylamide Formation in Fried and Baked Corn Chips and in French Fries," J. Food Science vol. 68, No. 4, 2003, pp. 1287-1290.
Kim, Cheong Tae, et al. "Reducing Acrylamide in Fried Snack Products by Adding Amino Acids" J. Food Science vol. 70, Nr. 5, 2005, pp. C354-C358.
Kirk, Raymond E., et al. "Enciclopedia de Tecnologia Quimica" 1962, pp. 986-998.
Kita, Agnieszka, et al. "Effective Ways of Decreasing Acrylamide Content in Potato Crisps During Processing" J. Agric. Food Chem., Oct. 15, 2004, vol. 52, pp. 7011-7016.
Kretovich, V.L. "Plant Biochemistry" book, 1986, pp. 8-11 (English translation).
Low, Mei Yin, et al. "Effect of Citric Acid and Glycine Addition on Acrylamide and Flavor in a Potato Model System" J. Agric. Food Chem. 2006, 54, pp. 5976-5983.
Martin, Fiona L., et al. "Formation of Strecker Aldehydes and Pyrazines in a Fried Potato Model System" J. Agric. Food Chem. 2001, 49, pp. 3885-3892.
May, N.J., et al. "Acrylamide formation in deep-fried potato products and removal of acrylamide precursors" Food Australia 58 (10) Oct. 2006, pp. 488-493.
Mizukami, Yuzo, et al. "Analysis of Acrylamide in Green Tea by Gas Chromatography—Mass Spectrometry" J. Agric. Food Chem. 2006, 54, pp. 7370-7377.
Mustafa, Arwa, et al. "Factors Influencing Acrylamide Content and Color in Rye Crisp Bread" J. Agric. Food Chem. 2005, 53, pp. 5985-5989.
NFRI Report, published Jul. 1, 2004, Report on the symposium named "Chemistry and Safety of Acrylamide in Food" held by the Agricultural and Food Chemistry Division of the American Chemical Society held on Mar. 28-31, 2004 in Anaheim, CA, USA, published by the National Food Research Institute (NFRI) of the National Agricultural and Food Research Organization of Japan (NARO), available at http://oasys2.confex.com/acs/227nm/techprogram/D941.HTM.
Summary Report of "2004 Acrylamide in Food Workshop: Update—Scientific Issues, Uncertainties, and Research Strategies," held on Apr. 13-15, 2004, in Chicago, IL, USA, published on Aug. 6, 2004, by the National Food Research Institute (NFRI) of the National Agricultural and Food Research Organization of Japan (NARO), available at http://222.jifsan.umd.edu/docs/acry2004.
Nielsen, Per Munk "Enzyme Technology for Production of Protein-Based Flavours" Novo Nordisk A/S 1995 (6 pages).
Ou, Shiyi, et al. "Reduction of Acrylamide Formation by Selected Agents in Fried Potato Crisps on Industrial Scale" ScienceDirect, Innovative Food Science and Emerging Technologies 9 (2008) pp. 116-121.

Pedreschi, Franco, et al. "Acrylamide reduction under different pre-treatments in French fries" ScienceDirect Journal of Food Engineering 79 (2007) pp. 1287-1294.

Pedreschi, Franco, et al. "Color development and acrylamide content of pre-dried potato chips" ScienceDirect Journal of Food Engineering 79 (2007) pp. 786-793.

Pedreschi, Franco, et al. "Color kinetics and acrylamide formation in NaCl soaked potato chips" ScienceDirect Journal of Food Engineering 79 (2007) pp. 989-997.

Pedreschi, Franco, et al. "Reduction of Acrylamide Formation in Potato Slices During Frying" Lebensm.-Wiss u.-Technol. 37 (2004) pp. 679-685.

Procter & Gamble Press Release Sep. 27, 2002 "Procter & Gamble Makes Significant Advances on Understanding Acrylamide Formation" found at http://biz.yahoo.com/prnews/020927/clf005_1.html (2 pages).

Rossell, J.B. (ed.) "Frying—Improving Quality" CRC Press, 2001, pp. 198-214 and 306-308.

Rydberg, Per, et al. "Investigations of Factors That Influence the Acrylamide Content of Heated Foodstuffs" J. Agric. Food Chem. 2003, vol. 51, pp. 7012-7018.

Sanders, R.A., et al. "An LC/MS Acrylamide Method and Its Use in Investigating the Role of Asparagine," printout of presentation slides (24 pages).

Segtnan, Vegard H., et al. "Screening of acrylamide contents in potato crisps using process variable settings and near-infrared spectroscopy" Mol. Nutr. Food Res. vol. 50, 2006, pp. 811-817.

Talburt & Smith (eds.), Potato Processing 4th Ed. 1987, Ch. 12 "Dehydrated Mashed Potatoes—Potato Granules," pp. 535-555.

Talburt & Smith (eds.), Potato Processing 4th Ed. 1987, "Improving the Color of Potato Chips," pp. 403-405.

"Temperature and Heat—Local Materials" Mar. 2003 found at http://web.archive.org/web/20030321105136/http://www.pa.uky.edu/sciworks/xtra/local.htm (3 pages).

U.S. Food and Drug Administration Public Meeting "Assessing Acrylamide in the U.S. Food Supply," Sep. 30, 2002(5 pages).

Viklund, Gunilla A., et al., "Variety and Storage Conditions Affect the Precursor Content and Amount of Acrylamide in Potato Crisps," J. Sci. Food Agric. 2008, vol. 88, pp. 305-312.

Vivanti, Vittorio, et al. "Level of Acrylamide Precursors Asparagine, Fructose, Glucose, and Sucrose in Potatoes Sold at Retail in Italy and in the United States" J. Food Science, vol. 71, Nr. 2, 2006, pp. C81-C85.

Watson, S.A. (ed.), Corn: Chemistry and Technology, American Association of Cereal Chemists, 1987, pp. 410-420.

Webb, Edwin C., "Enzyme Nomenclature 1992," Academic Press, p. 422.

Williams, J.S.E., "Influence of Variety and Processing Conditions on Acrylamide Levels in Fried Potato Crisps," ScienceDirect Food Chemistry 90 (2005), pp. 875-881.

Wulfsberg, Gary, Inorganic Chemistry book, University Science Books, 2000,p. 289.

Zhang, Yu, et al., "Study on Formation of Acrylamide in Asparagine-Sugar Microwave Heating Systems Using UPLC-MS/MS Analytical Method," ScienceDirect, Food Chemistry 108 (2008), pp. 542-550.

*Zyzak, David, et al.* v. *Elder, Vincent Allen, et al.*, Board of Patent Appeals and Interferences, Judgment-Arbitration-Bd.R. 126(f), Apr. 14, 2008, 2 pages.

\* cited by examiner

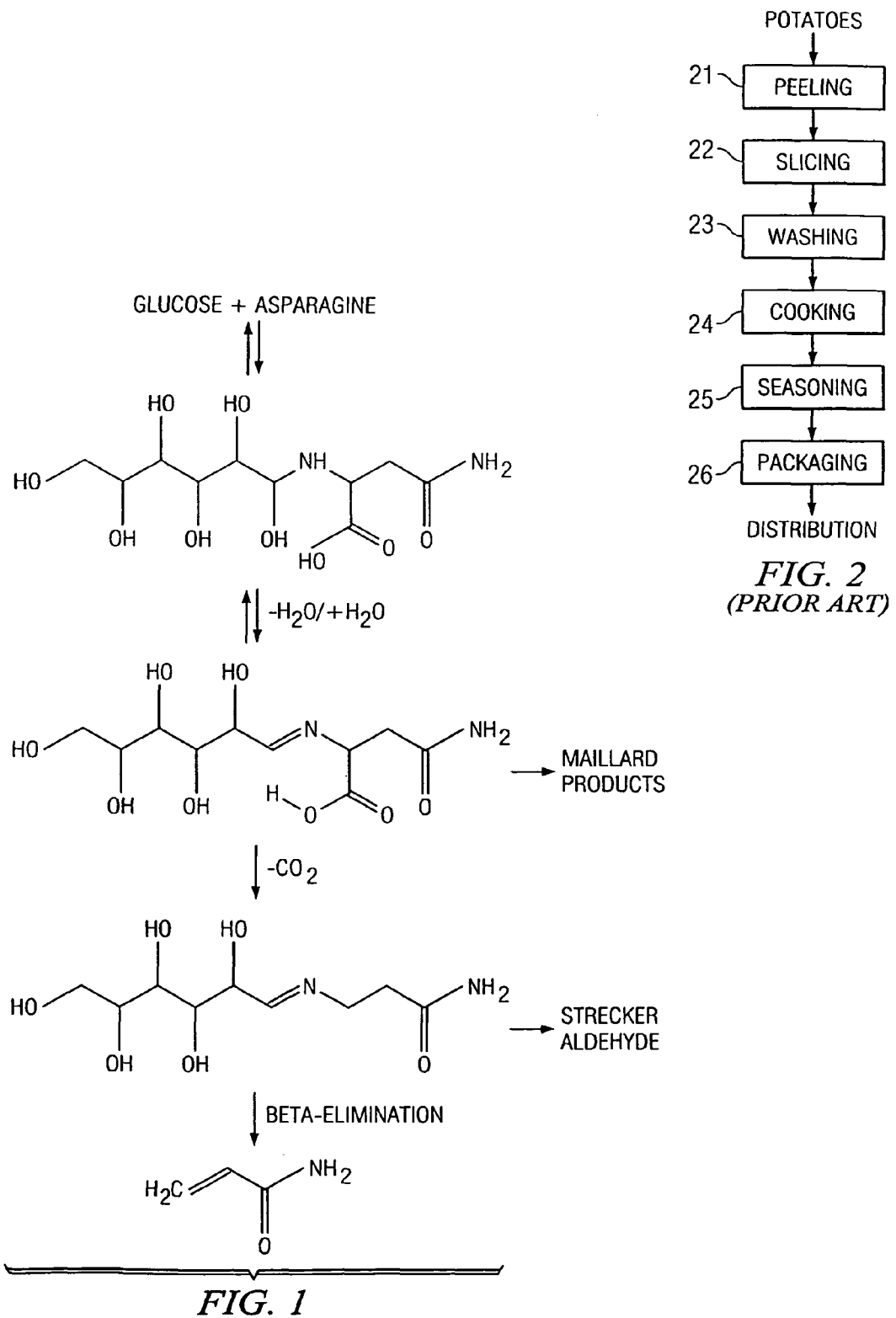

FIG. 10

| PARAMETER | CONTROL | TEST |
|---|---|---|
| FRYER INLET OIL TEMPERATURE, C | 179 | 174 |
| FRYER SLICE DWELL TIME, SEC | 190 | 190 |
| FRYER EXIT OIL TEMPERTURE, C | 154 | 149 |
| SLICE MOISTURE AT FRYER EXIT, WT % | 1.4 | 2.5 |
| FINISH DRYER AIR TEMPERATURE, C | NOT USED | 110 |
| PAR FRIED SLICE DWELL TIME IN FINISH DRYER, SEC | NOT USED | 360 |
| FINISHED DRIED CHIP MOISTURE AT DRYER EXIT, WT % | NOT APPLICABLE | 1.4 |
| FINISHED CHIP AA LEVEL, PPB | 640 | 160 |

FIG. 12

| TEST | INITIAL OIL TEMPERATURE, C | FRYING PRESSURE, MBAR | FRYING TIME, SEC | FINISHED CHIP MOISTURE, WT % | FINISHED CHIP AA, PPB |
|---|---|---|---|---|---|
| 1 | 180 | ATMOSPHERIC | 185 | 1.28 | 470 |
| 2 | 175 | ATMOSPHERIC | 205 | 1.59 | 350 |
| 3 | 170 | ATMOSPHERIC | 215 | 1.6 | 610 |
| 4 | 165 | ATMOSPHERIC | 240 | 1.57 | 350 |
| 5 | 140 | 100 | 240 | 1.6 | 53 |
| 6 | 120 | 100 | 300 | 1.8 | <5 |
| 7 | 100 | 50 | 600 | 1.6 | <5 |

| PARAMETER | CONTROL | TEST 1 | TEST 2 | TEST 3 | TEST 4 |
|---|---|---|---|---|---|
| INITIAL PAR FRY OIL TEMPERATURE C | 177 | 177 | 177 | 177 | 177 |
| PAR FRYER PRESSURE, MBAR | ATMOSPHERIC | ATMOSPHERIC | ATMOSPHERIC | ATMOSPHERIC | ATMOSPHERIC |
| PAR FRY TIME, SEC | 153 | 101 | 76 | 63 | 43 |
| PAR FRY SLICE MOISTURE, WT % | 0.83 | 3 | 5 | 7.5 | 10 |
| FINISH FRY OIL TEMPERATURE, C | NO FINISH FRY | 120 | 120 | 120 | 120 |
| FINISH FRY PRESSURE, MBAR | NO FINISH FRY | 100 | 100 | 100 | 100 |
| FINISH FRY TIME, SEC | NO FINISH FRY | 44 | 85 | 101 | 118 |
| FINISHED CHIP MOISTURE, WT % | 0.83 (SAME AS PAR FRY MOISTURE) | 0.71 | 0.74 | 0.82 | 0.96 |
| FINISHED CHIP AA, PPB | 370 | 220 | 48 | 34 | 13 |
| FINISHED CHIP OIL CONTENT % | 49.8 | 47.5 | 44.4 | 44.8 | 42.5 |

FIG. 11

METHOD FOR REDUCING ACRYLAMIDE FORMATION IN THERMALLY PROCESSED FOODS

This application is a divisional of U.S. application Ser. No. 10/371,448 entitled "Method for Reducing Acrylamide Formation in Thermally Processed Foods" filed on Feb. 21, 2003, which was issued on Jul. 1, 2008 as U.S. Pat. No. 7,393,550.

BACKGROUND OF THE INVENTION

1. Technical Field

The present invention relates to a method for reducing the amount of acrylamide in thermally processed foods. This invention permits the production of foods having significantly reduced levels of acrylamide. The method relies on varying the parameters of various unit operations to manipulate the amount of acrylamide found in the finished product while also maintaining product quality.

2. Description of Related Art

The chemical acrylamide has long been used in its polymer form in industrial applications for water treatment, enhanced oil recovery, papermaking, flocculants, thickeners, ore processing and permanent-press fabrics. Acrylamide precipitates as a white crystalline solid, is odorless, and is highly soluble in water (2155 g/L at 30° C.). Synonyms for acrylamide include 2-propenamide, ethylene carboxamide, acrylic acid amide, vinyl amide, and propenoic acid amide. Acrylamide has a molecular mass of 71.08, a melting point of 84.5° C., and a boiling point of 125° C. at 25 mmHg.

In very recent times, a wide variety of foods have tested positive for the presence of acrylamide monomer. Acrylamide has especially been found primarily in carbohydrate food products that have been heated or processed at high temperatures. Examples of foods that have tested positive for acrylamide include coffee, cereals, cookies, potato chips, crackers, french-fried potatoes, breads and rolls, and fried breaded meats. In general, relatively low contents of acrylamide have been found in heated protein-rich foods, while relatively high contents of acrylamide have been found in carbohydrate-rich foods, compared to non-detectable levels in unheated and boiled foods. Reported levels of acrylamide found in various similarly processed foods include a range of 330-2,300 (μg/kg) in potato chips, a range of 300-1100 (μg/kg) in french fries, a range 120-180 (μg/kg) in corn chips, and levels ranging from not detectable up to 1400 (μg/kg) in various breakfast cereals.

It is presently believed that acrylamide is formed from the presence of amino acids and reducing sugars. For example, it is believed that a reaction between free asparagine, an amino acid commonly found in raw vegetables, and free reducing sugars accounts for the majority of acrylamide found in fried food products. Asparagine accounts for approximately 40% of the total free amino acids found in raw potatoes, approximately 18% of the total free amino acids found in high protein rye, and approximately 14% of the total free amino acids found in wheat.

The formation of acrylamide from amino acids other than asparagine is possible, but it has not yet been confirmed to any degree of certainty. For example, some acrylamide formation has been reported from testing glutamine, methionine, cysteine, and aspartic acid as precursors. These findings are difficult to confirm, however, due to potential asparagine impurities in stock amino acids. Nonetheless, asparagine has been identified as the amino acid precursor most responsible for the formation of acrylamide.

Since acrylamide in foods is a recently discovered phenomenon, its exact mechanism of formation has not been confirmed. However, it is now believed that the most likely route for acrylamide formation involves a Maillard reaction. The Maillard reaction has long been recognized in food chemistry as one of the most important chemical reactions in food processing and can affect flavor, color, and the nutritional value of the food. The Maillard reaction requires heat, moisture, reducing sugars, and amino acids.

The Maillard reaction involves a series of complex reactions with numerous intermediates, but can be generally described as involving three steps. The first step of the Maillard reaction involves the combination of a free amino group (from free amino acids and/or proteins) with a reducing sugar (such as glucose) to form Amadori or Heyns rearrangement products. The second step involves degradation of the Amadori or Heyns rearrangement products via different alternative routes involving deoxyosones, fission, or Strecker degradation. A complex series of reactions including dehydration, elimination, cyclization, fission, and fragmentation result in a pool of flavor intermediates and flavor compounds. The third step of the Maillard reaction is characterized by the formation of brown nitrogenous polymers and co-polymers. Using the Maillard reaction as the likely route for the formation of acrylamide, FIG. 1 illustrates a simplification of suspected pathways for the formation of acrylamide starting with asparagine and glucose.

Acrylamide has not been determined to be detrimental to humans, but its presence in food products, especially at elevated levels, is undesirable. As noted previously, relatively higher concentrations of acrylamide are found in food products that have been heated or thermally processed. The reduction of acrylamide in such food products could be accomplished by reducing or eliminating the precursor compounds that form acrylamide, inhibiting the formation of acrylamide during the processing of the food, breaking down or reacting the acrylamide monomer once formed in the food, or removing acrylamide from the product prior to consumption. Understandably, each food product presents unique challenges for accomplishing any of the above options. For example, foods that are sliced and cooked as coherent pieces may not be readily mixed with various additives without physically destroying the cell structures that give the food products their unique characteristics upon cooking. Other processing requirements for specific food products may likewise make acrylamide reduction strategies incompatible or extremely difficult.

By way of example, FIG. 2 illustrates well known prior art methods for making fried potato chips from raw potato stock. The raw potatoes, which contain about 80% or more water by weight, first proceed to a peeling step 21. After the skins are peeled from the raw potatoes, the potatoes are then transported to a slicing step 22. The thickness of each potato slice at the slicing step 22 is dependent on the desired the thickness of the final product. An example in the prior art involves slicing the potatoes to a thickness of about 0.04 to about 0.08 inches. These slices are then transported to a washing step 23, wherein the surface starch on each slice is removed with water. The washed potato slices are then transported to a cooking step 24. This cooking step 24 typically involves flying the slices in a continuous flyer at, for example, about 171° C. to about 182° C. (340-360° F.) for approximately two to three minutes. The cooking step generally reduces the moisture level of the chip to less than 2% by weight. For example, a typical fried potato chip exits the fryer with approximately 1-2% moisture by weight. The cooked potato chips are then transported to a seasoning step 25, where seasonings are applied in a rotation drum. Finally, the seasoned chips proceed to a packaging step 26. This packaging step 26 usually involves feeding the seasoned chips to one or more weighers which then direct chips to one or more vertical form, fill, and seal machines for packaging in a flexible package. Once packaged, the product goes into distribution and is purchased by a consumer.

Minor adjustments in a number of the potato chip processing steps described above can result in significant changes in the characteristics of the final product. For example, an extended residence time of the slices in water at the washing step 23 can result in leaching compounds from the slices that provide the end product with its potato flavor, color and texture. Increased residence times or heating temperatures at the cooking step 24 can result in an increase in the Maillard browning levels in the chip, as well as a lower moisture content. If it is desirable to incorporate ingredients into the potato slices prior to frying, it may be necessary to establish mechanisms that provide for the absorption of the added ingredients into the interior portions of the slices without disrupting the cellular structure of the chip or leaching beneficial compounds from the slice.

By way of another example of heated food products that represent unique challenges to reducing acrylamide levels in the final products, snacks can also be made as a fabricated snack. The term "fabricated snack" means a snack food that uses as its starting ingredient something other than the original and unaltered starchy starting material. For example, fabricated snacks include fabricated potato chips that use a dehydrated potato product as a starting material and corn chips which use a masa flour as its starting material. It is noted here that the dehydrated potato product can be potato flour, potato flakes, potato granules, or any other form in which dehydrated potatoes exist. When any of these terms are used in this application, it is understood that all of these variations are included.

Referring back to FIG. 2, a fabricated potato chip does not require the peeling step 21, the slicing step 22, or the washing step 23. Instead, fabricated potato chips start with a dehydrated potato product such as potato flakes. The dehydrated potato product is mixed with water and other minor ingredients to form a dough. This dough is then sheeted and cut before proceeding to a cooking step. The cooking step may involve frying or baking. The chips then proceed to a seasoning step and a packaging step. The mixing of the potato dough generally lends itself to the easy addition of other ingredients. Conversely, the addition of such ingredients to a raw food product, such as potato slices, requires that a mechanism be found to allow for the penetration of ingredients into the cellular structure of the product. However, the addition of any ingredients in the mixing step must be done with the consideration that the ingredients may adversely affect the sheeting characteristics of the dough as well as the final chip characteristics.

It would be desirable to develop one or more methods of reducing the level of acrylamide in the end product of heated or thermally processed foods. Ideally, such a process should substantially reduce or eliminate the acrylamide in the end product without adversely affecting the quality and characteristics of the end product. Further, the method should be easy to implement and, preferably, add little or no cost to the overall process.

SUMMARY OF THE INVENTION

The present invention is a method for reducing the amount of acrylamide in thermally processed food products. According to one embodiment, the method comprises providing a continuous feed of peeled and sliced raw potatoes and contacting the continuous feed of raw potato slices with an aqueous solution at about 60° C. (140° F.) for about five minutes to reduce the amount of acrylamide precursor in the raw potato slices. According to another embodiment, the method comprises providing a continuous feed of peeled and sliced raw potatoes, par-frying the raw potato slices at about 171° C. to about 182° C. (340-360° F.) until the moisture content is reduced to about 3-10% moisture by weight, then oven-drying the par-fried slices at less than about 120° C. (250° F.) until the moisture content is further reduced to about 1-2% moisture by weight. According to another embodiment, the method comprises contacting a continuous feed of raw potato slices with an aqueous solution at about 60° C. (140° F.), followed by par-flying the raw contacted potato slices at about 171° C. to about 182° C. (340-360° F.) until the moisture content is reduced to about 3-10% moisture by weight, then oven-drying the par-fried slices at less than about 120° C. (250° F.) until the moisture content is further reduced to about 1-2% moisture by weight. Other embodiments involve different combinations of various methods for contacting and cooking a continuous feed of peeled and sliced potatoes as well as the manipulation of various other unit operations. By manipulating these unit operations, one can avoid creating the conditions most favorable for acrylamide formation and thereby reduce acrylamide formation in the thermally processed food product.

For example, the washing step of a typical potato-chip-making process can be manipulated to comprise a contacting step where the potato slices are contacted with an aqueous solution. The contact time and temperature can be increased and manipulated, and one or more ingredients can be added to the aqueous solution. The cooking step can be manipulated by dividing it into a higher-temperature first heating step and a lower-temperature second heating step. The higher-temperature first heating step can comprise atmospheric frying, vacuum frying, pressure frying, microwave-assisted frying, or baking, and other means known in the art. The second heating step can comprise vacuum frying, low temperature oven drying, vacuum oven drying, or any method of cooking that maintains cooking temperatures required by the second heating step. Other methods for manipulating the contacting and cooking unit operations to reduce acrylamide formation are possible.

The above, as well as additional features and advantages of the invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 1 is a schematic of suspected chemical pathways for acrylamide formation;

FIG. 2 is a schematic of prior art potato chip processing steps;

FIG. 10 is a chart showing the operating conditions and results of an experiment in which a control sample of potato slices was atmospheric fried to 1.4% moisture by weight, and a test sample was atmospheric fried to 2.5% moisture by weight, then oven-dried to 1.4% moisture by weight;

FIG. 11 is a chart showing the operating conditions and results of several experiments in which a control sample of potato slices was atmospheric fried to about 0.8% moisture by weight, and four test samples were atmospheric par-fried to about 3-10% moisture by weight, then low-temperature vacuum fried to below 1% moisture by weight; and FIG. 12 is a chart showing the operating conditions and results of seven experiments in which four test samples were atmospheric fried in oil with initial temperatures ranging from about 165 to about 180° C. (329-356° F.) for about 3-4 minutes, and three test samples were low-temperature vacuum fried for about 4-10 minutes at temperatures ranging from about 100 to about 140° C. (212-284° F.) and pressures ranging from 50-100 millibars.

DETAILED DESCRIPTION OF THE INVENTION

Figure 3:
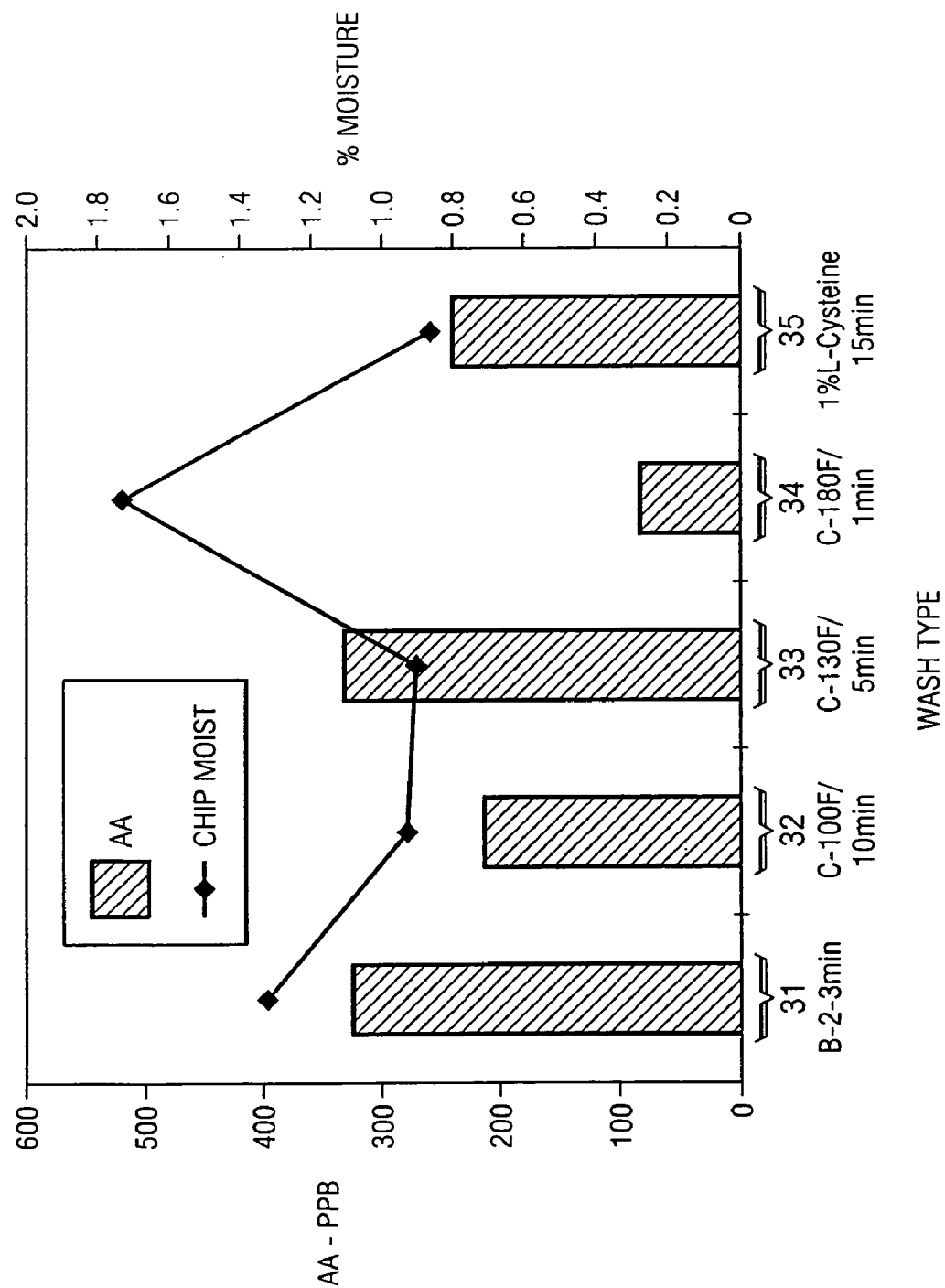
FIG. 3 is a graph showing, on the y-axis in parts per billion ("ppb"), acrylamide concentrations of potato test samples that were fried after contacting in various ways described along the x-axis, as well as the final moisture content by weight.

The formation of acrylamide in thermally processed foods requires a source of carbon and a source of nitrogen. It is hypothesized that carbon is provided by a carbohydrate source and nitrogen is provided by a protein source or amino acid source. Many plant-derived food ingredients such as rice, wheat, corn, barley, soy, potato and oats contain asparagine and are primarily carbohydrates having minor amino acid components. Typically, such food ingredients have a small amino acid pool, which contains other amino acids in addition to asparagine.

By "thermally processed" is meant food or food ingredients wherein components of the food, such as a mixture of food ingredients, are heated at temperatures of at least 80° C. Preferably, the thermal processing of the food or food ingredients takes place at temperatures between about 100° C. and about 205° C. The food ingredient may be separately processed at elevated temperature prior to the formation of the final food product. An example of a thermally processed food ingredient is potato flakes, which is formed from raw potatoes in a process that exposes the potato to temperatures as high as 170° C. Examples of other thermally processed food ingredients include processed oats, par-boiled and dried rice, cooked soy products, corn masa, roasted coffee beans and roasted cacao beans. Alternatively, raw food ingredients can be used in the preparation of the final food product wherein the production of the final food product includes a thermal heating step. One example of raw material processing wherein the final food product results from a thermal heating step is the manufacture of potato chips from raw potato slices by the step of frying at a temperature of from about 100° C. to about 205° C. or the production of french fries fried at similar temperatures.

In accordance with the present invention, however, a significant formation of acrylamide has been found to occur when the amino acid asparagine is heated in the presence of a reducing sugar. Heating other amino acids such as lysine and alanine in the presence of a reducing sugar such as glucose does not lead to the formation of acrylamide. But, surprisingly, the addition of other amino acids to the asparagine-sugar mixture can increase or decrease the amount of acrylamide formed.

Having established the rapid formation of acrylamide when asparagine is heated in the presence of a reducing sugar, a reduction of acrylamide in thermally processed foods can be achieved by inactivating the asparagine. By "inactivating" is meant removing asparagine from the food or rendering asparagine non-reactive along the acrylamide formation route by means of conversion or binding to another chemical that interferes with the formation of acrylamide from asparagine.

Investigations into the effects of the various unit operations or processing steps on the formation of acrylamide in finished food products have lead to interesting results. These results demonstrate an ability to modify one or more unit operations in any given prior art process for making a food product so that the resulting cooked food product has a reduced concentration of acrylamide. By "reduced concentration of acrylamide" is meant a concentration of acrylamide that is lower than the concentration that would have formed during an unmodified prior art process for cooking the particular food product in question. The terms "reduced concentration of acrylamide," "reduced acrylamide concentration," and "reduced acrylamide level" are all used interchangeably in this application. For the purpose of this application, "unit operations" means a definable segment of an overall method for producing a food product. For example, referring to FIG. 2, each one of the potato chip processing steps (the peeling step 21, the slicing step 22, the washing step 23, the cooking step 24, the seasoning step 25, and the packaging step 26) is considered a separate unit operation with regard to the overall process of producing a potato chip food product.

A first example of the manipulation of a unit operation involves the washing step 23 (illustrated in FIG. 2) of potato chips produced by slicing raw potato stock. The prior art method of washing slices involves rinsing the chips with water at room temperature. The average residence time of each chip in this water rinse in the prior art is typically less than about 60 seconds, depending on the equipment used.

FIG. 3 illustrates how the chip washing unit operation can be manipulated such that acrylamide levels in the finished chip product can be adjusted. According to the present invention, the washing step 23 can be manipulated to comprise a contacting step, where a continuous feed of potato slices is contacted with an aqueous solution for residence times and at temperatures that differ from those used in the prior art washing step. FIG. 3 is a chart showing on the left (from the viewer's perspective) vertical or y-axis, the amount of acrylamide ("AA") in parts per billion ("ppb") found in the finished potato chip product. The right vertical or y-axis of the graph in FIG. 3 shows the percent moisture by weight in the finished chip product. The acrylamide level is charted on the graph by the vertical bars, while the percent moisture level is charted by the line plot. The horizontal or x-axis of the chart shown in FIG. 3 lists various processing parameter changes made to the washing unit operations of a potato chip manufacturing process. The cooking time and temperature were identical for all product runs reflected in FIG. 3. Specifically, each sample was fried at about 178° C. (353° F.) for about 120-140 seconds. Consequently, the moisture levels of the end product tended to vary.

By way of comparison to the results shown in FIG. 3, the prior art washing step described above, using chip-stock potatoes sliced to a thickness of 0.05 inches and fried at about 178° C. (353° F.) for about 120-140 seconds, results in a finished product having an acrylamide level of about 300-500 ppb (which can be higher depending on glucose content and other potato stock variable ) and a final moisture level by weight of about 1.4%. This prior art result is quite similar to the first data point 31 found on the chart shown in FIG. 3, which represents the base data point and involves a washing step with a water residence time for the potato slices of two to three minutes. Maintaining all other parameters in the overall processing of the potato chip, this minor change in the washing unit operations results in no noticeable change in the acrylamide level (approximately 330 ppb) or the moisture level of the finished product (approximately 1.35%), as compared to a product finished according to the prior art washing step.

The next data point 32 shown on the graph in FIG. 3 reflects a change in the washing step that comprises contacting the potato slices with water as the aqueous solution, increasing the contact time of the aqueous solution with the potato slices to ten minutes, and increasing the temperature of the aqueous solution from ambient or room temperature to about 38° C. (100° F.). This adjustment resulted in a decrease of the acrylamide in the finished product to approximately 210 ppb and a reduction in the moisture level of the finished product to less than 1% by weight. Interestingly, the third data point 33 reflects that increasing the aqueous solution (again, water) temperature to about 54° C. (130° F.) with an average contact time of five minutes did not result in appreciable reduction in acrylamide levels in the finished product. By contrast, the fourth data point 34 demonstrates an appreciable reduction in acrylamide levels in the final product (below 100 ppb) when the washing unit operation involves a contacting step providing one minute contact time with an aqueous solution comprising water at a temperature of about 82° C. (180° F.). However, the moisture level of the end-product chip was nearly 1.8%. The fifth data point 35 reflects that using a 1% L-Cysteine solution as the aqueous solution, at ambient temperatures for fifteen minutes, reduces the acrylamide level in the final product to less than 250 ppb.

Figure 4:
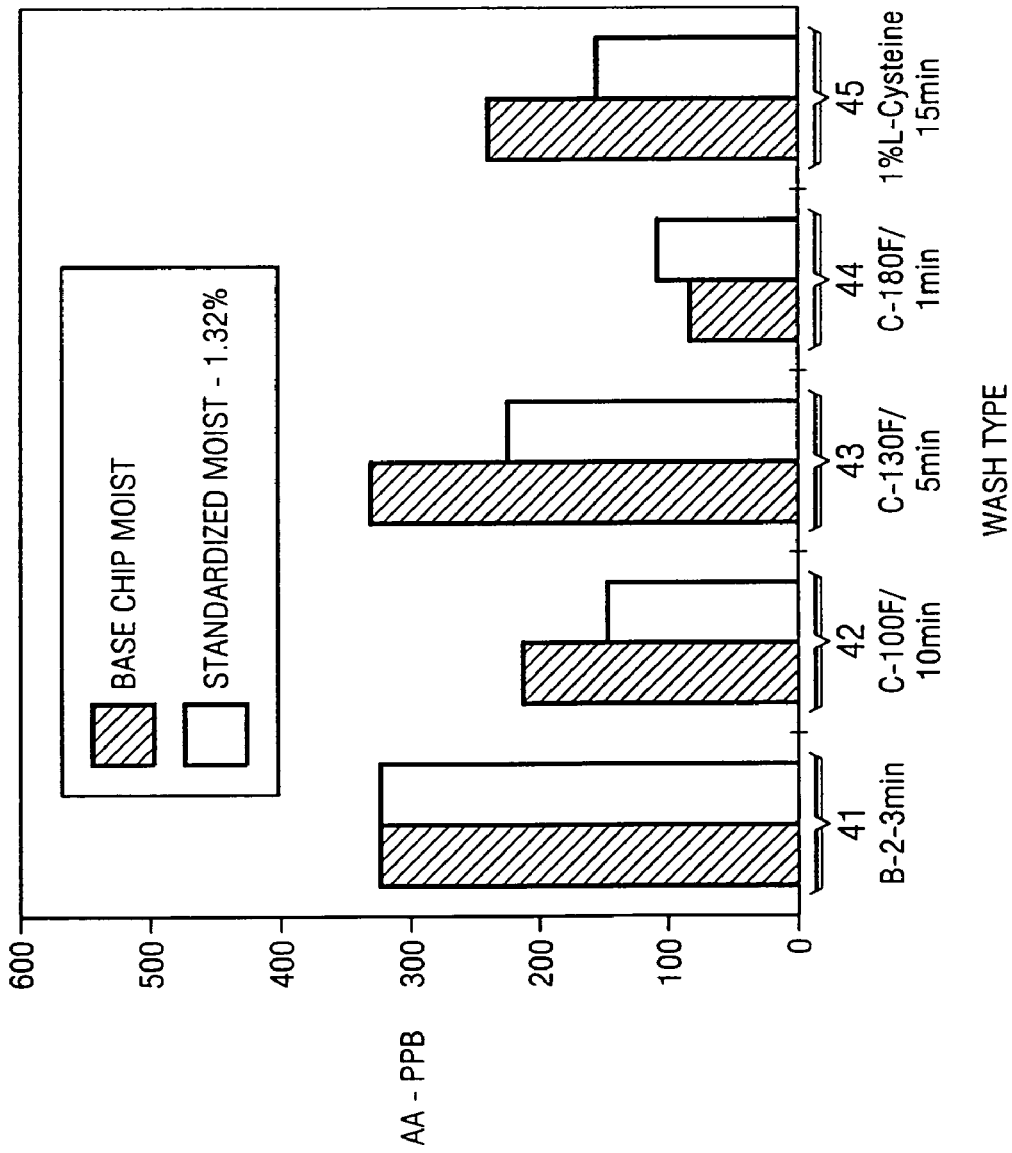
FIG. 4 is a graph comparing the original results from FIG. 3 with the FIG. 3 results after normalization to a moisture content of 1.32% by weight.

In the graph illustrated in FIG. 4, the experiment results shown in FIG. 3 (the first of each pair of vertical bars) are normalized to depict the acrylamide levels that could be expected if the test samples were fried to the same standardized moisture level (the second of each pair of vertical bars). By assuming that the percent change in acrylamide level is inversely proportional to the percent change in the moisture level when moisture levels are low, the results of the test data shown in FIG. 3 can be normalized by multiplying the actual acrylamide levels by the percent change in the moisture levels required to reach the final moisture level of the base/standard sample. Normalizing the experiment data to the same moisture level allows one to more accurately compare the relative effectiveness of each contacting method at reducing acrylamide formation.

Referring back to FIG. 4, the vertical or y-axis is again labeled in ppb of acrylamide found in the finished product. The horizontal or x-axis is labeled to show the parameters of each data point. In FIG. 4, each data point shows a pair of vertical bars, the bars on the left of a pair are imported from FIG. 3 while the bars on the right of a pair reflect the expected results of the same contacting process parameters if the final product were fried to a uniform or standardized moisture level of 1.32%.

Once again, the first data point 41 is the base sample involving a two to three minute water wash at ambient temperature. The second data point 42 involves the contacting step according to the present invention, where the potato slices are contacted with an aqueous solution comprising water at a temperature of about 38° C. (100° F.) for a ten minute contact time. The left-hand bar again reflects that such contacting followed by frying at approximately 178° C. (353° F.) for about 120-130 seconds will result in just over 200 ppb acrylamide in the finished product and a finished product having a moisture level of less than 1%. However, the right-hand bar demonstrates that if a chip thus contacted were fried to a standardized moisture level of 1.32%, the projected acrylamide level would drop to approximately 150 ppb.

A similar desirable result occurs with regard to the third data point 43, while the fourth data point 44 reflects that the reduction of the moisture level of the finished product slightly raises the acrylamide level found. Interestingly, the last data point 45 reflects significant acrylamide reduction when an aqueous solution comprising 1% L-Cysteine and a fifteen-minute contact time is used. Furthermore, a particularly low acrylamide level is projected for a final chip moisture level of 1.32% by weight. It is also interesting to note that the projected acrylamide level for potato slices contacted with 1% L-Cysteine for a fifteen-minute contact time is nearly the same as the projected level for slices contacted with an aqueous solution comprising water for ten minutes at about 38° C. (100° F.).

According to other embodiments, contacting the potato slices with an aqueous solution further comprises removing one or more acrylamide precursors, such as asparagine or reducing sugars, from the raw potato slices by leaching such acrylamide precursors out of the raw potato slices with a potato extract or a leaching stream. Leaching of components in the potato slices by the potato extract or the leaching stream occurs for those components for which a concentration gradient exists between the potato slices and the potato extract or the leaching stream. The leaching may be accomplished selectively by a potato extract solution that is deficient in the acrylamide precursor to be removed, but has concentration levels of other soluble matter that are at or near equilibrium with the corresponding concentration levels in the potato slices. The leaching may also be accomplished non-selectively by a leaching stream such as pure water. An example of selective leaching involves making the potato extract deficient in asparagine, and then contacting the raw potato slices with the asparagine-deficient potato extract to leach asparagine out of the raw potato slices. According to one embodiment, the potato extract deficient in one or more acrylamide precursors contacts the raw potato slices in a counter-current fashion, which may lead to more effective leaching than a parallel flow. In another embodiment, the leaching is further enhanced by ultrasonically vibrating the potato extract while it is in contact with the potato slices. If desired, the potato extract or the leaching stream can be treated to remove the leached acrylamide precursors so that the potato extract or the leaching stream can be recycled for continuous use in the leaching of more potato slices.

One point that must be kept in mind when reviewing the effects of manipulating various parameters of unit operations, such as those effects shown in FIGS. 3 and 4, is that all of these adjustments will have some collateral effect on the quality and characteristics of the final product. Consequently, any adjustments made in any of the unit operations must be carefully selected in order to arrive at the product exhibiting the desired final characteristics. These characteristics include color, flavor, mouth-feel, density, smell, and the shelf-life aspects of the finished product.

Figure 5:
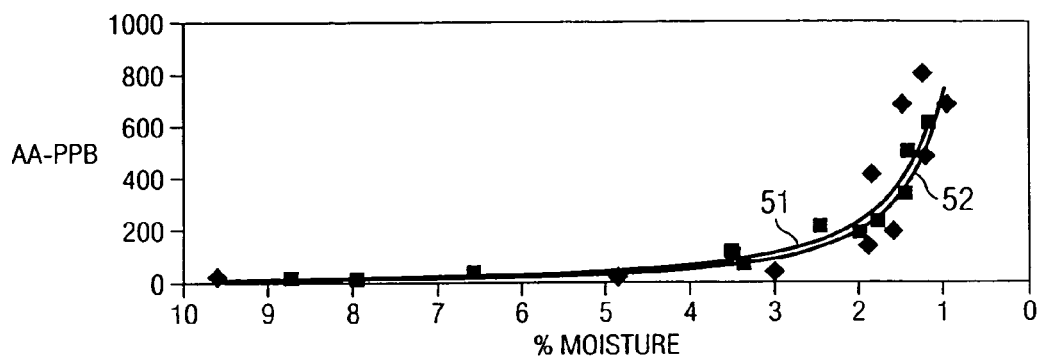
FIG. 5 is a graph showing the relationship between acrylamide concentration and final fried product moisture wherein the acrylamide concentration in ppb is on the y-axis, and the moisture content in weight percent is on the x-axis.

FIG. 5 focuses on another aspect of unit operations and shows the effect of decreasing moisture level in the chip during the cooking stage. Referring back to FIG. 2, the cooking step 24 is a unit operation that typically involves cooking sliced potato chips in a continuous oil fryer at high temperatures. Returning to FIG. 5, the graph thereon reflects on the horizontal or x-axis the moisture level of the final chip product. The vertical or y-axis is again labeled in ppb of acrylamide ("AA") found in the final product. A number of data points are then plotted showing a percent moisture versus the acrylamide level of the final chip. Two different frying temperatures were used with diamond symbols representing chips fried at about 178° C. (353° F.) while square symbols are used to represent data points for chips fried at about 149° C. (300° F.). The line plots 51, 52 are curve-fitted to the data points in order to establish a trend. The curve-fitted line plots 51, 52 follow the general equation: $y=c\,x^b$, where "y" represents the acrylamide level, "c" is a constant, "x" is the moisture level, and "b" is the exponent of "x." The first line plot 51 relates to the 149° C. (300° F.) frying temperature data points. The second line 52 relates to the data points plotted for the 178° C. (353° F.) flying temperature. As can be seen in FIG. 5, acrylamide levels remain very low at chip moisture levels above about 3% moisture by weight regardless of frying temperature.

Figure 6:
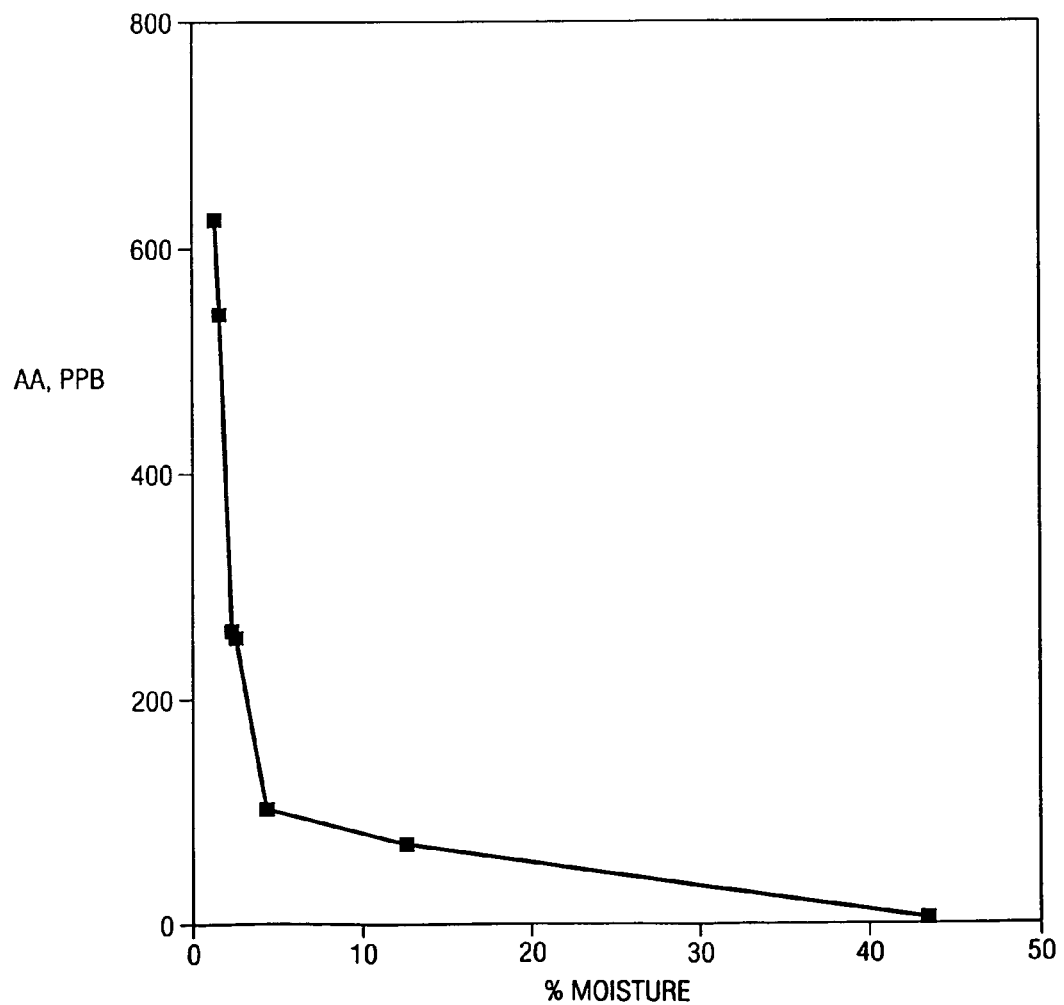
FIG. 6 is a graph showing the relationship between acrylamide concentration and final baked product moisture wherein the acrylamide concentration in ppb is on the y-axis, and the moisture content in weight percent is on the x-axis.

Whereas FIG. 5 shows the relationship between acrylamide levels and moisture content in fried potato slices, FIG. 6 depicts the same relationship in baked potato chip products made from a dry mix. The vertical axis of the graph in FIG. 6 shows acrylamide concentrations, while the horizontal axis shows moisture levels by weight. While the acrylamide concentrations tend to be higher in baked potato chip products than in fried potato slices, FIGS. 5 and 6 both show that the acrylamide concentrations remain fairly low in cooking potato products until the moisture level falls below about 3%.

What is made apparent by FIGS. 5 and 6 is that acrylamide levels in potato chips cooked in a typical fryer increase rather dramatically once the moisture level falls below 3% moisture by weight, at which point it seems there is not enough moisture left to keep the product temperature below an acrylamide formation temperature. For example, FIG. 5 illustrates that the level of acrylamide found in the final product is relatively low when the moisture level of the chip during the cooking unit operation is 3% by weight or greater, regardless of the exposure to high-temperature cooking environments. FIGS. 5 and 6 demonstrate that moisture level is a useful additional parameter in a unit operation that can be adjusted for the reduction of acrylamide formation in the final product.

Unfortunately, the moisture level in a finished potato chip should ideally be below about 2%, and preferably between about 1.3 and 1.4%. Anything higher than 2%, and even higher than 1.4% can lead to staling and microbial spoilage issues in the packaged product, as well as organoleptic consequences, for example, taste, texture, etc. However, changes in color, taste, and consistency of the final product can be adjusted by various means. In addition, it may be possible to counter the consequences of finishing the food product with a higher moisture content by adjusting various factors in the pre-packaging step, such as extending flyer hoods, covering conveyors to the packaging machine, dehumidification of the plant environment, and various factors in the packaging, such as packaging materials, films, bags and seals. Thus, according to another embodiment of the disclosed method for reducing acrylamide formation in thermally processed foods, a further unit operation comprises finishing the food product as it emerges from its final cooking step at a moisture content, for example, at about 1.4% by weight, about 1.6% by weight, about 1.8% by weight and about 2% by weight, or at any % moisture weight between 1.4% and 2%.

However, it is important to note that other potato products have been known to form significant amounts of acrylamide even at relatively high moisture content. For example, french fries, which typically leave a fryer with over 15% moisture by weight, have been shown to develop significant amounts of acrylamide during cooking. This suggests that acrylamide formation depends on the temperature (particularly the surface temperature) of a cooking product rather than overall moisture content. In fact, studies have shown that acrylamide does not form in significant amounts until the necessary reactants are exposed to temperatures of about 250° F./120° C. It thus appears that a potato product containing acrylamide precursor compounds will not form significant amounts of acrylamide until, upon cooking, the product temperature, which may differ significantly from the cooking medium's temperature, rises above about 120° C. (250° F.). Nevertheless, the moisture content of such product can be a good indication of whether the product temperature has risen above a formation temperature for acrylamide.

It has been theorized by those of ordinary skill in the art that moisture in the product helps keep the internal product temperature below the acrylamide formation temperature, even while in a relatively high-temperature environment. When most of the moisture is removed, however, high-temperature surroundings can cause the product temperature to rise above the acrylamide formation temperature. It is important to keep in mind, though, that not all portions of a cooking product share the same internal temperature. French fries, for example, can be fairly thick when compared to potato slices and thus tend to have a larger moisture gradient between the inner and outer portions of the product. Consequently, it is possible for a french fry being cooked to have a fairly high surface temperature even though its interior moisture content is high. In contrast, a potato slice is thinner and tends to have more consistent moisture levels throughout the slice during cooking. Thus, at least for thin products such as potato slices or fabricated potato pieces, moisture level can still be a good gauge of its internal temperature. This also holds true for non-potato products made from corn, barley, wheat, rye, rice, oats, millet, and other starch-based grains. Furthermore, continuous cooking equipment can be designed with different temperature stages that progressively decrease from higher to lower temperatures as the moisture content of the cooking product decreases. This enables moisture to be removed rapidly without allowing the product temperature to rise above the acrylamide formation temperature.

Consequently, one element of this invention involves dividing the cooking unit operation (the fourth unit operation 24 shown in FIG. 2) into at least two separate heating steps. A first heating step occurs at elevated temperatures to reduce the moisture level to some point near but above 3% by weight. The product is then finished to the desired moisture level of about 1-2% by weight, but preferably about 1.4% by weight, with a lower-temperature cooking step having a temperature below about 120° C. (250° F.). However, the process modifications described herein are not limited to prior art processes for cooking potato slices such as the one disclosed in FIG. 2. These modifications are also applicable in processes for making fabricated products derived from potato, corn, wheat, rye, rice, oats, millet, and other starch-based grains. For example, these process modifications can be used to reduce acrylamide formation in fabricated potato and corn products, cereals, cookies, crackers, hard pretzels, and breads, to name a few. Note that the terms "modified cooking step" and "modified cooking unit operation" are meant to include not only FIG. 2's prior art method for cooking potato slices but also prior art methods for preparing other food products in which it is desirable to reduce acrylamide formation. In addition, the term "potato-based pieces" is meant to include both raw potato slices and fabricated potato pieces derived from potato starch or dough.

Each heating step can be accomplished using various heating methods. For example, the first heating step can comprise atmospheric flying, vacuum frying, microwave-assisted frying, or baking. The first heating step, however, can alternatively comprise any other method for cooking the product and lowering its moisture level with primary consideration given to production efficiencies such as residence time, energy costs, equipment capital costs and available floor space. When the first heating step involves frying the product, the first heating step is often called "par-frying," as such frying only partially cooks the product until its moisture content is lowered to some point near but above 3% by weight. The second heating step can comprise vacuum frying, low temperature oven drying, vacuum oven drying, or any method of cooking that maintains cooking temperatures required by the second heating step. However, other methods can also be used to reduce moisture content while avoiding the low-moisture/high-temperature conditions most favorable to acrylamide formation as long as the product temperature remains below the acrylamide formation temperature of about 120° C. (250° F.). The second heating step is often called "finish-frying" or "finish-drying," as the moisture content is further reduced to the final desired level.

Figure 7A:
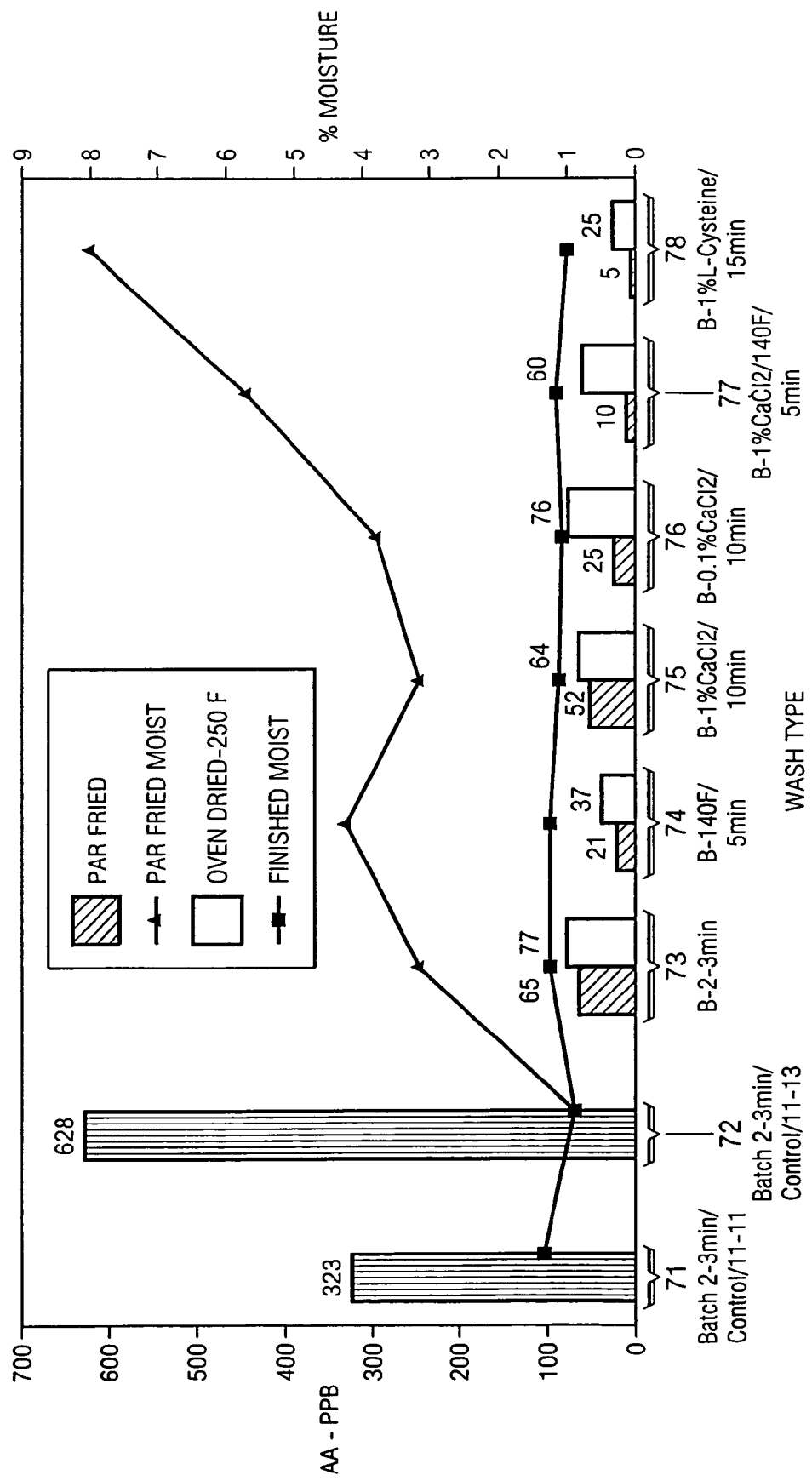
FIG. 7a is a graph showing the acrylamide concentrations in potato test samples that were par-fried and then oven-dried at about 120° C. (250° F.) after various methods of contacting, wherein acrylamide concentrations are shown on the y-axis in ppb, and the various contact methods are described on the x-axis.
Figure 7B:
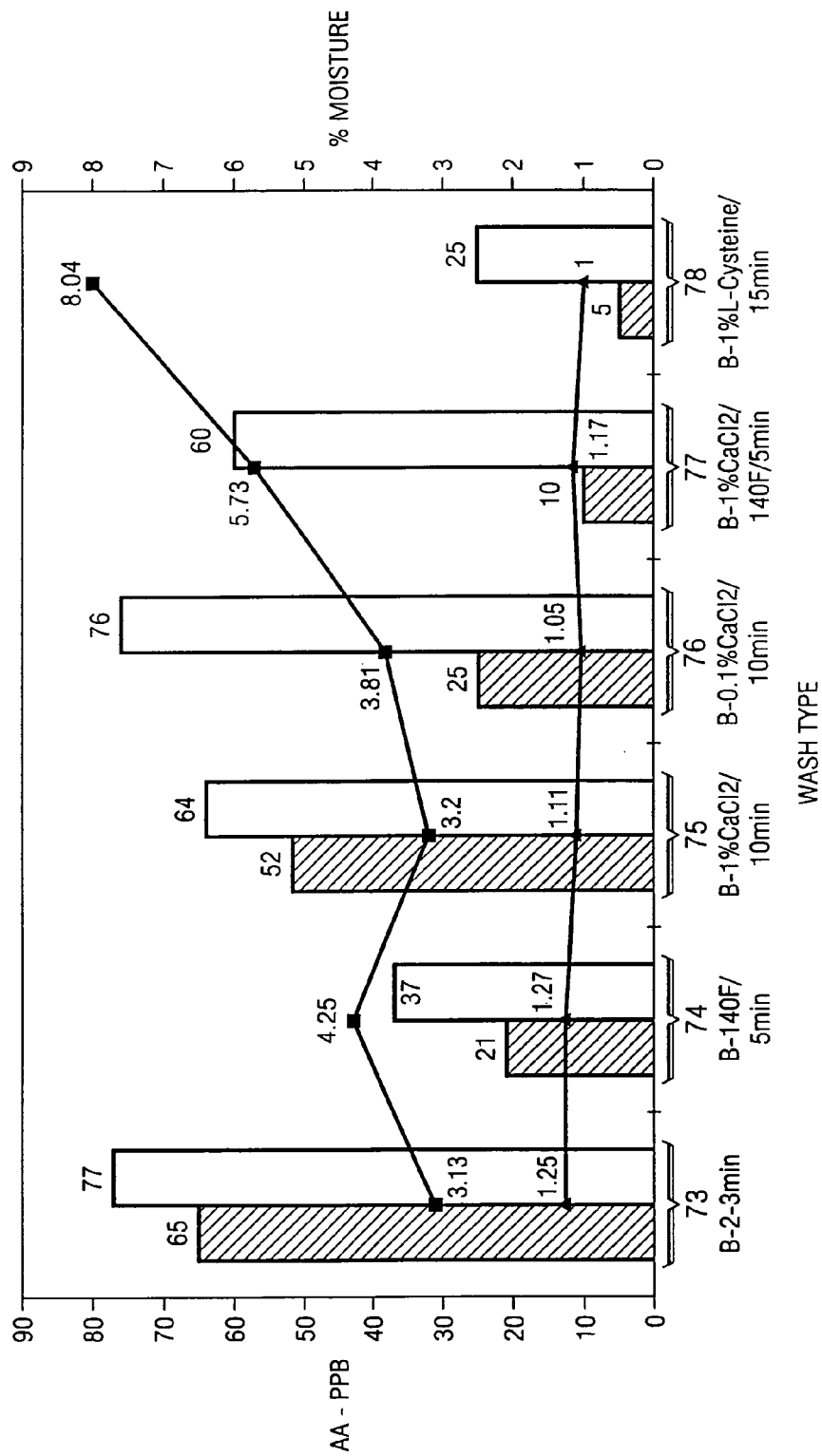
FIG. 7b is a graph showing the last six data points of FIG. 7a on a narrower acrylamide concentration scale.
Figure 8:
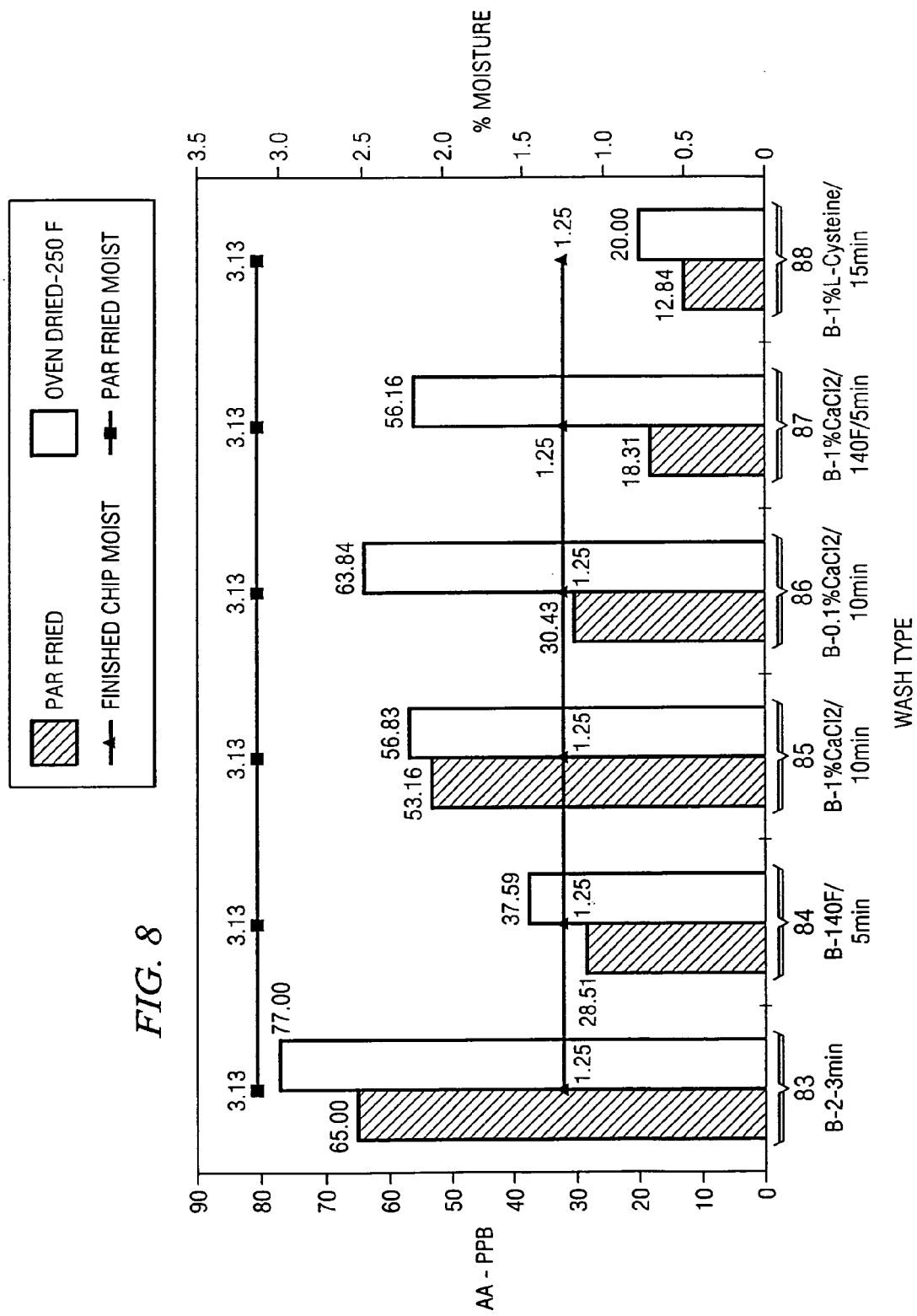
FIG. 8 is a graph showing the data from FIG. 7a after normalizing the par-fry data to a moisture level of 3.13% by weight and normalizing the oven-dry data to a moisture level of 1.25% by weight.

By modifying the washing step 23 and/or the cooking step 24 of the process for making potato chips shown in FIG. 2, acrylamide levels in the final product can be reduced significantly without adversely affecting product quality and final characteristics. In one preferred embodiment, a potato-chip-making process using fresh chipping potatoes combines traditional peeling, slicing, and washing steps with a modified cooking unit operation involving par-frying at about 165 to about 182° C. (330-360° F.) for about 1-3 minutes, followed by oven-drying below about 120° C. (250° F.) until the chip moisture level is reduced to about 1.4% by weight. In tests using this preferred embodiment, acrylamide levels below 130 ppb are achieved. This preferred embodiment achieves a balance between a high level of acrylamide reduction with an acceptable change in product quality associated with the necessary process modifications. However, other embodiments are possible. FIGS. 7a, 7b, and 8 show various examples of combinations of washing modifications comprising contacting with an aqueous solution and cooking modifications that reduce final acrylamide levels from those levels resulting from the prior art methods. For example, a final acrylamide level of more than 300 ppb is reduced to less than 100 ppb. Although FIGS. 7a, 7b, and 8 involve embodiments for processing raw potato slices, the modified washing methods used in those embodiments can also apply to other types of raw foods in which acrylamide reduction is desirable, such as sweet potatoes, yams, and plantains. Likewise, the cooking modifications used in those embodiments can also apply to other fried food products such as fried tortillas, fried plantains, fried sweet potatoes, and fried yams.

FIG. 7a depicts the resulting acrylamide levels of potato chips made from combining several different embodiments of a modified washing step comprising contacting with one particular embodiment of a modified cooking step. The modified cooking step of FIG. 7a comprises partially frying ("par frying") potato slices at about 178° C. (353° F.) for approximately one to three minutes in a first heating step, then oven-drying the potato slices at about 120° C. (250° F.) until the moisture content is reduced to approximately 1.3% by weight in a second heating step. The advantage of par-frying followed by oven-drying is that the low-moisture/high-temperature conditions most favorable to acrylamide formation can be avoided while still producing final products that are organoleptically similar to traditionally fried products. However, extensive oven-drying can give the product a dry-mouth feel and may cause product scorching that is difficult to mask.

The vertical or y-axis of the graph in FIG. 7a shows acrylamide concentrations in ppb, while the horizontal or x-axis is labeled to show the parameters of each embodiment of the modified washing step comprising contacting the potato slices with an aqueous solution. Each data point shows a pair of vertical bars: the left bar represents acrylamide concentrations after contacting and par-frying while the right bar represents acrylamide concentrations after oven-drying. Reading left to right, the first data point 71 of FIG. 7a, like that of FIGS. 3 and 4, is a base sample involving a two to three minute water wash at ambient temperature, after which the sample is then atmospherically fried to roughly 1.3% moisture by weight. The second data point 72 is like the first except the sample is fried to about 1.0% moisture. Note that the first and second samples 71, 72 developed about 320 ppb and 630 ppb of acrylamide, respectively. The third data point 73 involves the same two to three minute ambient water wash, but the sample is then par fried to slightly above 3% moisture and oven-dried to about 1.3% moisture. The left and right bars show that the sample exited the par-frying step with a relatively low acrylamide concentration of about 65 ppb and gained less than 15 ppb in the oven-drying step. The fourth data point 74 involves an aqueous solution comprising water contacting the potato slices for a five minute contact time at about 60° C. (140° F.), followed by the par-frying and oven-drying steps of the modified cooking unit operation. This five-minute, 60° C. (140° F.) contact combined with the par-flying and oven-drying steps resulted in an even lower final acrylamide concentration of less than 40 ppb.

The samples contacted with calcium chloride solutions 75, 76, 77 all produced acrylamide levels higher than that produced by the sample 74 contacted with pure water for five minutes at about 60° C. (140° F.). However, the final acrylamide levels of all such samples were still below 80 ppb, which is significantly lower than the 320 ppb in the base sample.

The last data point 78 involves a 15-minute contact with an aqueous solution comprising 1% L-cysteine. Interestingly, of the several contacting methods shown in FIG. 7a, this contacting method produced the lowest concentration of acrylamide. This contacting method, however, also required the longest contact time of the various methods shown in FIG. 7a. Although using 1% L-cysteine 78 as the aqueous solution for contacting resulted in the lowest level of acrylamide in the final product, other factors must be considered, such as the effect of such a long contact time on product quality, as well as the expense of increasing contact time.

FIG. 7b shows the last six data points 73, 74, 75, 76, 77, 78 of FIG. 7a on a graph with a narrower acrylamide concentration scale.

In FIG. 8, the results shown in FIG. 7b have been normalized to depict the acrylamide levels that could be expected if the test samples were fried to a moisture level slightly above 3% by weight and then oven-dried at about 120° C. (250° F.) to a standardized moisture level of about 1.3% by weight. The acrylamide levels are normalized in the same manner described above with respect to FIG. 4. When comparing the results 83, 84, 88 shown in FIG. 8 with those of similar experiments 41, 43, 45 shown in FIG. 4, one can see that dividing the cooking unit operation into a first high-temperature heating step and a second lower-temperature heating step significantly reduces acrylamide levels. Whereas FIG. 4 shows that frying in a traditional manner to a standardized 1.32% moisture level by weight should result in acrylamide concentrations ranging from slightly above 100 ppb to over 400 ppb, FIG. 8 shows that par-frying and oven-drying to the same standardized moisture level should result in significantly lower acrylamide concentrations under 100 ppb. The cumulative benefit of combining both a modified washing unit operation comprising a contacting step with a modified cooking unit operation is particularly apparent when comparing the 54° C. (130° F.)/5 min contact data point 43 of FIG. 4 and the 60° C. (140° F.)/5 minute contact data point 84 of FIG. 8 with the base data point 41 of FIG. 4. As discussed above with respect to FIG. 4, increasing the contacting time from 2-3 minutes to 5 minutes and increasing the contacting temperature from ambient to about 54° C. (130° F.) causes the acrylamide level in the final product to decrease from about 330 ppb to approximately 230 ppb. The second data point 84 of FIG. 8 shows that the final acrylamide level can be further reduced to less than 40 ppb when a similar 5-minute, 60° C. (140° F.) contacting step is followed by a modified cooking unit operation involving par-frying and oven-drying.

Figure 9:
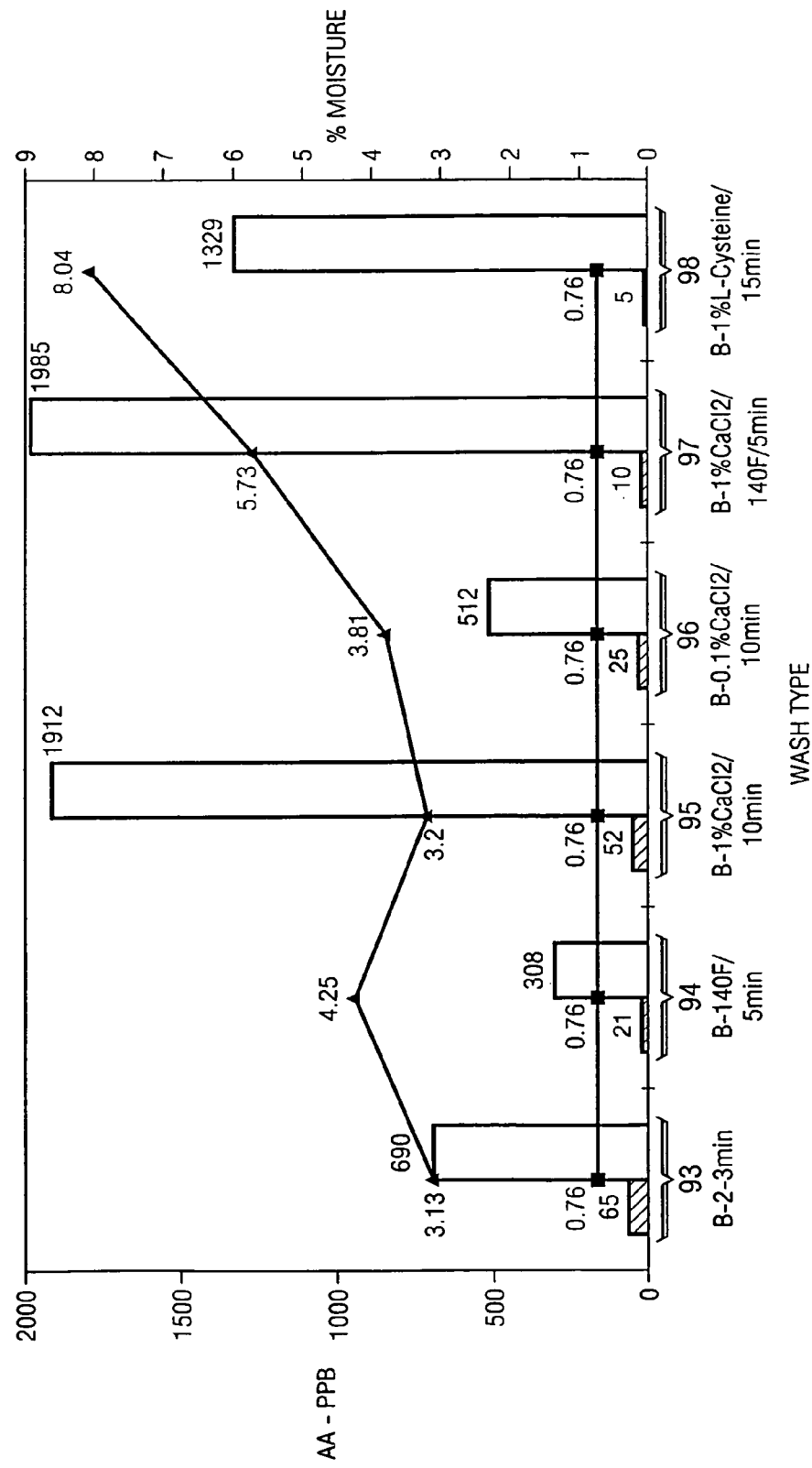
FIG. 9 is a graph showing on the y-axis in ppb: 1) the acrylamide levels of potato test samples that were contacted in the various ways shown on the x-axis, then par-fried at about 178° C. (353° F.), and 2) the acrylamide levels of those same potato test samples after oven-drying at about 176° C. (350° F.), normalized to a moisture level of 0.76% by weight.

FIG. 9 shows the dramatic increase in final acrylamide concentrations that results from using an oven-drying temperature above about 120° C. (250° F.). In FIG. 9, the test samples were contacted and then par-fried in the same manner as in FIG. 7b, but the samples were then oven-dried at about 176° C. (350° F.) rather than about 120° C. (250° F.). The final acrylamide concentrations of the test samples were then normalized to show the expected acrylamide levels upon reaching 0.76% by weight (which is the final moisture content that was reached in the base-point/standard two-to-three minute water wash shown as the first data point). Comparing the second data point 74 of FIG. 7b with the second data point 94 of FIG. 9, for example, increasing the oven-drying temperature from about 120° C. (250° F.) to about 176° C. (350° F.) increased the acrylamide concentration from slightly below 40 ppb to approximately 270 ppb. This oven-drying temperature increase similarly caused the acrylamide concentrations of the other test samples to dramatically increase from below 100 ppb to over 500 ppb. Another test sample (not shown) was washed to remove surface starch, par-fried at about 176° C. (350° F.) to a moisture content of between about 3-5% by weight, and then dried in a commercial Wenger oven at about 132° C. (270° F.) to a final moisture content of about 1.3% by weight, resulting in an acrylamide level of about 270 ppb. The results 93, 94, 95, 96, 97, 98 shown in FIG. 9, as well as the results from the test sample oven-dried at about 132° C. (270° F.), thus illustrate the advantages of keeping the cooking and/or drying temperature of the product less than or equal to about 120° C. (250° F.) when the moisture content falls below approximately 3% by weight. This principle applies not only to raw potato slices but also to other raw foods, such as yams and plantains, and fabricated products derived from potato, corn, barley, wheat, rye, rice, oats, millet, and other starch-based grains.

FIG. 10 charts the results and operating conditions of yet another embodiment in which potato slices were washed, par-fried, and then oven-dried. A control sample 101 was processed in a manner similar to that described with respect to the base samples 71, 72 shown in FIG. 7a. After about a 20-30 second ambient-temperature water wash, followed by briefly contacting the potato slices with a dilute (3-5%) solution of sodium chloride for a few seconds, a control sample 101 of 1.45 mm thick slices of peeled Hermes chipping potatoes was par-fried in oil having an initial temperature of about 179° C. (354° F.) for approximately three minutes to 1.4% moisture by weight. The control sample 101 had an acrylamide concentration of 640 ppb, similar to the 630 ppb produced in the second base sample 72 shown in FIG. 7a. The test sample 102 was similarly washed and contacted like the control sample 101. Using a large commercial fryer, the test sample 102 was then par-fried in oil having an initial temperature of about 174° C. (345° F.) for about three minutes until the moisture content decreased to 2.5% by weight. The par-fried test sample 102 was then finish-dried for about six minutes using an oven at about 110° C. (230° F.) until the moisture level decreased to 1.4% by weight. Cooking in this manner produced product with a reduced acrylamide concentration of 160 ppb, which is roughly 25% of the acrylamide concentration of the control sample 101.

In yet another set of tests (not shown) similar to those shown in FIG. 10, potato slices underwent a standard wash procedure, were par-fried to about 3-5% moisture by weight, and then oven-dried to less than about 2% moisture by weight. A control sample was washed and then fried at about 179° C. (354° F.) to a finished moisture content of about 1.3% by weight, resulting in an acrylamide level of 380 ppb. However, par-frying test samples at about 179° C. (354° F.) to a moisture content of between about 3 to about 5% resulted in acrylamide levels of approximately 64 ppb. The par-fried product was then dried in a commercial Wenger oven at various temperatures. It was shown that drying the par-fried slices at about 115° C. (240° F.) to a final moisture content of about 1.3% moisture by weight in a Wenger oven resulted in acrylamide levels of 125 ppb. Interestingly, drying the par-fried slices at about 100° C. (212° F.) and under atmospheric or slightly less than atmospheric pressure (13.6 to 14.6 psia), even for extended periods of time (even as long as 10-15 minutes), did not increase the acrylamide levels. This embodiment demonstrates that potato slices can be par-fried at about 179° C. (354° F.) to a moisture content of between 3-5% and then oven-dried at about 100° C. (212° F.) under atmospheric or slightly below atmospheric pressure without increasing the acrylamide levels beyond what is formed in the par-frying operation. To further reduce the concentration of acrylamide formed in the cooked product, potato slices can be removed from the par-fry step with moisture levels as high as 10% by weight, but removing the product too soon can affect the final texture of the product. Note, however, that this method is not limited to raw potato slices and can be applied to other fried food products such as fried tortillas, fried plantains, fried sweet potatoes, and fried yams. The advantage of par-frying and then oven-drying at about 100° C. (212° F.) is that the cooking unit operation alone can be modified to significantly reduce acrylamide formation from above 300 ppb to less than about 70 ppb; the standard peeling, slicing, and washing steps need not be modified.

In the set of embodiments involving par-frying followed by oven-drying, it is also possible to conduct the oven-drying under vacuum in order to enhance moisture removal. By oven-drying under vacuum, less time is required to dry the product to the desired final moisture content. Although it has been shown that oven-drying at or near 100° C. (212° F.) does not cause any measurable increase in acrylamide levels, oven-drying at that temperature takes a relatively long time to dry the product. Thus, vacuum oven-drying helps decrease the amount of time it takes for product to dry. It also helps decrease the amount of time the product is exposed to acrylamide-forming temperatures, should higher oven-drying temperatures be used.

While FIGS. 7a, 7b, 8, and 10 depicted test results from combining one particular embodiment of a modified cooking unit operation with several different embodiments of a modified washing unit operation comprising a contacting step, other embodiments and combinations are possible. For example, the various different contacting steps shown in those figures can instead be followed by a different modified cooking unit operation. Alternatively, an improved method for reducing acrylamide formation can simply utilize a modified cooking unit operation without modifying any of the other unit operations. In another set of embodiments of the invention, the second of the two heating steps of a modified cooking unit operation comprises vacuum finish-frying rather than atmospheric frying. By finish-frying under vacuum, the partially fried or cooked product emerging from the first heating step can continue to be fried, but at a temperature too low to form significant amounts of acrylamide. According to one embodiment, the vacuum pressure should be such that frying occurs below about 120° C. (250° F.). Such vacuum finish-frying can also be applied to other fried food products such as those derived from potato, corn masa, barley, wheat, rice, oats, millet, and other starch-based grains.

FIG. 11 charts the results and operating conditions of several examples of a modified cooking unit operation involving par-frying followed by vacuum finish-frying. In the control 110 and test samples 111, 112, 113, 114, Hermes variety of chipping potatoes were peeled, sliced to about 1.35 mm thickness, and subjected to a standard 20-to-30-second ambient-temperature water wash. After washing, the control sample 110 was fried at atmospheric pressure in oil having an initial temperature of about 177° C. (351° F.) for about 2.5 minutes to a moisture level of 0.83% by weight, producing an acrylamide concentration of 370 ppb. In Tests 1-4, all of the test samples 111, 112, 113, 114 were atmospheric par-fried at about 177° C. (351° F.) and vacuum finish-fried at about 120° C. (248° F.) and 100 millibars, but each was par-fried and vacuum finish-fried for different lengths of time. In Test 1 111, 220 ppb of acrylamide were found in the test sample after washing, atmospheric par-frying for about 100 seconds to 3% moisture by weight, and vacuum finish-frying for 44 seconds to about 0.7% moisture by weight. The results of Tests 2-4 112, 113, 114 show that acrylamide levels in the final product dramatically decrease when par-frying is stopped, and vacuum finish-drying is commenced, before the moisture content decreases to 3% by weight. Tests 2-4 112, 113, 114 all produced final acrylamide concentrations below 50 ppb. In Test 4 114, an acrylamide level of only 13 ppb was achieved by par-frying to 10% moisture by weight, then vacuum-frying to about 1% moisture by weight. As can be seen from the data, partially frying slices to higher moisture content before they are low-temperature vacuum finish-fried dramatically lowers final acrylamide concentrations. This method can also be used to reduce the final acrylamide concentrations in other fried products such as fried tortillas, fried plantains, fried sweet potatoes, and fried yams. The advantages of vacuum finish-frying after par-frying to about 3-10% moisture by weight are that the final stages of cooking can be completed at low temperatures without affecting product texture, and its effectiveness at reducing acrylamide formation can eliminate the need for a modified washing step comprising contacting the product with an aqueous solution. However, vacuum finish-frying also allows for the final stages of cooking to be completed at temperatures higher than those that can be used when not frying under a vacuum, while still providing a reduced acrylamide concentration in the finished product. It is noted that the vacuum finish-fried product had a lighter color than the control sample, and transferring cooking product from the par-frying operation to the vacuum finish-frying unit at higher moisture levels may impart a bland flavor to the product. It should be kept in mind that the capital cost of vacuum finish-frying equipment may be greater than that of oven-drying equipment.

Similarly, vacuum par-frying can be used in the first of the two heating steps of a modified cooking unit operation. As an example, one embodiment of a modified cooking unit operation involves vacuum par-frying to a moisture content near but above the threshold moisture level of 3-4% by weight, then oven-drying at no greater than about 120° C. (250° F.) to completion. By par-frying under vacuum, the product can be fried at lower temperature, thus producing less acrylamide. Furthermore, oven-drying at or below about 120° C. (250° F.) ensures that little to no additional acrylamide is formed during the oven-drying stage. The advantage of using vacuum par-frying in the first of the two heating steps, particularly when doing so below about 120° C. (250° F.) and even below about 140° C. (284° F.) when under vacuum, is that little to no acrylamide will be formed in the first step, whereas par-frying generally produces at least some level of acrylamide. However, vacuum-frying in the first heating step may create product with different finished characteristics.

For baked product lines, which can involve fabricated snacks or products such as cereals, cookies, crackers, hard pretzels, and bread, another embodiment of the invention comprises a modified cooking unit operation with a higher-temperature first baking step and a lower-temperature second baking step. In the cooking unit operation of this embodiment, the product is first baked at higher temperature (above about 120° C. (250° F.)) until its moisture content is reduced to about 4% to about 10% by weight. The product is then oven-dried (finish-dried or baked) at a temperature no greater than about 120° C. (250° F.) until the desired moisture level, typically about 1% to about 3% by weight, is attained. For example, a convection oven can be used in the higher-temperature first heating step to reduce product moisture content to about 10% by weight. The oven may be divided into four heating zones in which the temperature is highest in the first zone and gradually decreases through the remaining three zones. A downdraft, single zone, convection oven may be used in the lower-temperature second heating step to complete the cooking process. Other types of ovens, however, can be used for the two heating steps of this embodiment. Also, the lower-temperature second heating step of this particular embodiment, like that of the embodiments involving par-frying followed by oven-drying, can be performed at about 100° C. (212° F.) and slightly below atmospheric pressure so that little to no additional acrylamide is formed after the higher-temperature first heating step.

In tests using one example embodiment that involved a higher-temperature first baking step and a lower-temperature second baking step, fabricated potato pieces were first baked at a temperature above about 120° C. (250° F.) until the moisture levels decreased to approximately 10% by weight. The pieces were then finish-dried at about 110° C. (230° F.) for about 10 minutes until the moisture content decreased to about 1.7-2.2% by weight. Final acrylamide levels of about 100-200 ppb were reported. However, when several samples of partially-baked pieces were finish-dried at about 120° C. (250° F.) to about 1.6% moisture by weight, acrylamide levels of between 470 and 750 ppb were reported. Furthermore, substantially higher acrylamide levels of between 460 and 1900 ppb were produced when samples of partially-baked slices were finish-fried at about 132° C. (270° F.) to about 1.6-2.2% moisture by weight. These results reemphasize the importance of keeping the cooking or drying temperature of a cooking product at or below about 120° C. (250° F.) during the final stages of cooking. This principle applies not only to the cooking of fabricated potato pieces but also to other fabricated products derived from potato, corn, barley, wheat, rye, rice, oats, millet, and other starch-based grains. This principle also applies to the cooking of raw foods such as yams and plantains.

In another embodiment of the invention, rather than dividing the modified cooking unit operation into a higher-temperature first heating step and a lower-temperature second heating step, the modified cooking unit operation instead comprises vacuum frying for the entire cooking process. FIG. 12 charts the results and operating conditions of several examples of such an embodiment. In Tests 1-4 121, 122, 123, 124, various control groups of peeled, sliced, 1.45 mm thick Hermes chipping potatoes were washed in ambient-temperature water for about 30 seconds, then processed through a standard continuous fryer. The fryer inlet oil temperature was varied within the range of about 165 to about 180° C. (329-356°), and the control samples were fried for about 3-4 minutes, resulting in acrylamide levels over 300 ppb. In contrast, the test samples in Tests 5-7 125, 126, 127 all produced acrylamide concentrations below 60 ppb after low-temperature vacuum frying for about 4 to about 10 minutes at temperatures ranging from about 100 to about 140° C. (212-284° F.) and pressures ranging from about 50 to about 100 millibars. As can be seen from the data, vacuum flying at reduced temperatures dramatically reduces the amount of acrylamide formed. Furthermore, little to no acrylamide is formed when the product is vacuum-fried below a temperature of about 120° C. (250° F.) throughout the entire cooking process. Tests 6 and 7 126, 127, for instance, show that vacuum frying under about 120° C. (250° F.) and at a pressure of no greater than 100 millibars results in virtually undetectable levels (less than 5 ppb) of acrylamide. The advantage of frying under about 120° C. (250° F.) is that little to no acrylamide is formed, whereas high-temperature par-frying causes at least some acrylamide to form. However, temperatures greater than about 120° C. (250° F.) can be used when vacuum frying or vacuum finish-frying is employed, while still achieving a reduced acrylamide concentration in the finished product. For example, in test 5 125, vacuum frying at 140° C. (284° F.) produced a product with an acrylamide content of about 53 ppb. Given this result, it seems likely that vacuum finish frying or vacuum frying alone could produce products having less than about 100 ppb acrylamide at temperatures up to 143° C. (290° F.). It should be kept in mind, however, that vacuum frying throughout the entire cooking process may significantly alter product texture, appearance, and flavor.

For baked product lines, which can involve fabricated snacks, cereals and other starch or dough-based products as explained above, the modified cooking unit operation can alternatively comprise low-temperature baking for the entire cooking process. Low-temperature baking can be performed at or below about 120° C. (250° F.) so that little to no acrylamide is formed. However, lower-temperature baking may create lighter-colored products, while higher-temperature baking may create darker-colored products. Thus, the applicability of low-temperature baking depends in part on the desired color characteristics of the final product.

This invention contemplates combining the teachings herein with regard to various unit operation manipulations in order to achieve a desired acrylamide level in the end product along with the desired end-product characteristics. The combinations used depend on the starting product and the desired end product and can be adjusted by one skilled in the art pursuant to the teachings herein. The effect of pH on acrylamide formation is another factor that may be considered and combined with the teachings herein.

It should be understood that changes in the characteristics of the final product, such as changes in color, taste, and consistency can be adjusted by various means. For example, color characteristics in potato chips can be adjusted by controlling the amount of sugars in the starting product. Some flavor characteristics can be changed by the addition of various flavoring agents to the end product. The physical texture of the product can be adjusted by, for example, the addition of leavening agents or various emulsifiers.

While the invention has been particularly shown and described with reference to one or more embodiments, it will be understood by those skilled in the art that various approaches to the reduction of acrylamide in thermally processed foods may be made without departing from the spirit and scope of this invention. For example, while the process has been disclosed herein with regard to potato products, the process can also be used in processing of food products made from corn, barley, wheat, rye, rice, oats, millet, and other starch-based grains. In addition to potato chips, the invention can be used in making corn chips and other types of snack chips, as well as in cereals, cookies, crackers, hard pretzels, breads and rolls, and the breading for breaded meats. In each of these foods, the present invention's method for manipulating one or more unit operations can be combined with other strategies for the reduction of acrylamide to produce an acceptable acrylamide level without adversely affecting the taste, color, odor, or other characteristics of an individual food.

We claim:

1. A method for reducing acrylamide formation in thermally processed foods, said method comprising the steps of:
   a) providing a plurality of raw potato slices having an initial moisture level prior to cooking of at least 4% by weight;
   b) par-frying said raw potato slices in cooking oil having a temperature above about 120° C. until said raw potato slices have a par-fried moisture level ranging from about 3% by weight to about 10% by weight, thereby forming a plurality of par-fried potato slices; and
   c) vacuum frying said par-fried potato slices between about 105° C. and about 140° C. until said par-fried potato slices have a final moisture level ranging from about 1% by weight to about 2% by weight, thereby forming a plurality of potato chips having a reduced acrylamide concentration.

2. The method for reducing acrylamide formation in thermally processed foods of claim 1 wherein said par-frying is performed in a plurality of stages in which the temperature decreases from one stage to the subsequent stage.

3. The method for reducing acrylamide formation in thermally processed foods of claim 1 wherein said vacuum frying is performed in a plurality of stages, each of which heats at a successively lower temperature.

4. The method for reducing acrylamide formation in thermally processed foods of claim 1 wherein step a) further comprises contacting said raw potato slices with an aqueous solution.

5. The method for reducing acrylamide formation in thermally processed foods of claim 4 wherein said contacting is performed using water at an ambient temperature.

6. The method for reducing acrylamide formation in thermally processed foods of claim 4 wherein said contacting is performed using water at a temperature above ambient temperature.

7. The method for reducing acrylamide formation in thermally processed foods of claim 4 wherein said contacting is performed using an aqueous solution of calcium chloride.

8. The method for reducing acrylamide formation in thermally processed foods of claim 4 wherein said contacting is performed using an aqueous solution of L-cysteine.

9. The method for reducing acrylamide formation in thermally processed foods of claim 4 wherein said contacting comprises leaching at least one acrylamide precursor out of said raw potato pieces.

10. The method for reducing acrylamide formation in thermally processed foods of claim 9 further comprising leaching at least one acrylamide precursor out of said raw potato pieces with a potato extract that is deficient in the acrylamide precursor being leached.

11. The method for reducing acrylamide formation in thermally processed foods of claim 1 wherein said reduced acrylamide concentration is less than 200 ppb.

12. The method for reducing acrylamide formation in thermally processed foods of claim 1 wherein said reduced acrylamide concentration is less than 100 ppb.

13. The method for reducing acrylamide formation in thermally processed foods of claim 1 wherein said reduced acrylamide concentration is less than 50 ppb.

* * * * *